US010027503B2

(12) United States Patent
Patrick et al.

(10) Patent No.: US 10,027,503 B2
(45) Date of Patent: Jul. 17, 2018

(54) INTEGRATED DOOR LOCKING AND STATE DETECTION SYSTEMS AND METHODS

(71) Applicant: Echostar Technologies L.L.C., Englewood, CO (US)

(72) Inventors: Edward Kelley Patrick, Lawrenceville, GA (US); William Sean Mahan, Sandy Springs, GA (US); Daniel Nadeau, Cumming, GA (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 554 days.

(21) Appl. No.: 14/553,763

(22) Filed: Nov. 25, 2014

(65) Prior Publication Data
US 2015/0159401 A1 Jun. 11, 2015

Related U.S. Application Data

(60) Provisional application No. 61/914,856, filed on Dec. 11, 2013.

(51) Int. Cl.
*E05C 1/02* (2006.01)
*H04L 12/28* (2006.01)
(Continued)

(52) U.S. Cl.
CPC ...... *H04L 12/2825* (2013.01); *G07C 9/00571* (2013.01); *H04N 21/4131* (2013.01);
(Continued)

(58) Field of Classification Search
CPC ...... E05C 1/02; E05C 1/06; E05B 2047/0067; E05B 2047/0068; E05B 2047/0069;
(Continued)

(56) References Cited

U.S. PATENT DOCUMENTS 3,803,575 A * 4/1974 Gotanda ............... E05B 45/083
200/61.64
4,127,966 A 12/1978 Schmidt
(Continued)

FOREIGN PATENT DOCUMENTS

CA 2 267 988 A1 4/1998
CH 702136 B1 * 5/2011 ......... B23Q 11/0891
(Continued)

OTHER PUBLICATIONS

Author Unknown, "Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
(Continued)

*Primary Examiner* — Christine M Mills
(74) *Attorney, Agent, or Firm* — Kilpatrick Townsend & Stockton

(57) ABSTRACT

Arrangements of integrated door lock and position sensor devices are presented. A wireless interface may be configured to wirelessly communicate with one or more remote computerized devices. A sensor may be incorporated into the device that detects when the door is open or closed. A lock may be incorporated into the device that, when engaged and the door is closed, prevents the door from being opened from at least one side of the door may be incorporated into the device. A controller may be configured to determine when the door is open, shut, locked, and/or unlocked using information from the lock and the sensor.

8 Claims, 9 Drawing Sheets

(51) Int. Cl.
*H04N 21/41* (2011.01)
*G07C 9/00* (2006.01)
*H04N 21/422* (2011.01)
*H04N 21/436* (2011.01)
*H04N 21/4363* (2011.01)
*E05B 47/00* (2006.01)

(52) U.S. Cl.
CPC ..... *H04N 21/422* (2013.01); *H04N 21/42202* (2013.01); *E05B 2047/0068* (2013.01); *E05B 2047/0069* (2013.01); *E05B 2047/0094* (2013.01); *G07C 2209/62* (2013.01); *H04N 21/43615* (2013.01); *H04N 21/43637* (2013.01); *Y10T 292/096* (2015.04)

(58) Field of Classification Search
CPC .... E05B 2047/0094; E05B 9/02; E05B 59/00; E05B 45/08; E05B 45/083; E05B 45/086; E05B 2047/0089; Y10T 292/096; Y10T 292/1014; G07C 2209/62; G07C 9/00571
USPC ..... 292/137, 138; 340/5.7, 5.22, 542, 686.2, 340/686.3, 686.4, 686.6, 545.6, 545.7
See application file for complete search history.

(56) References Cited

U.S. PATENT DOCUMENTS

| | | |
|---|---|---|
| 4,386,436 A | 5/1983 | Kocher et al. |
| 4,581,606 A | 4/1986 | Mallory |
| 4,694,607 A | 9/1987 | Ishida et al. |
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,111,517 A | 8/2000 | Atick et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1 | 9/2001 | Garvey et al. |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,445,287 B1 * | 9/2002 | Schofield ............ B60C 23/0401 340/442 |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,792,319 B1 | 9/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,081,830 B2 | 7/2006 | Shimba et al. |
| 7,082,359 B2 * | 7/2006 | Breed ................ G07C 5/008 701/31.5 |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayernick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,179,248 B2 * | 5/2012 | Eakle, Jr. ................ E05B 41/00 340/528 |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,355,886 B2 * | 1/2013 | Ollivier ................ B60J 5/04 356/614 |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,533,144 B1 | 9/2013 | Reeser et al. |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,237,141 B2 | 1/2016 | Logue et al. |
| 9,246,921 B1 | 1/2016 | Vlaminck et al. |
| 9,258,593 B1 | 2/2016 | Chen et al. |

(56) References Cited

U.S. PATENT DOCUMENTS

| | | | |
|---|---|---|---|
| 9,286,482 B1 | 3/2016 | Dumont et al. | |
| 9,347,242 B2* | 5/2016 | Cregg | E05B 45/00 |
| 9,353,550 B1* | 5/2016 | Smith, III | E05B 41/00 |
| 9,443,142 B2 | 9/2016 | Reynolds, Jr. | |
| 9,462,041 B1 | 10/2016 | Hagins et al. | |
| 9,495,860 B2 | 11/2016 | Lett | |
| 9,511,259 B2 | 12/2016 | Mountain | |
| 9,589,448 B1 | 3/2017 | Schneider et al. | |
| 9,599,981 B2 | 3/2017 | Crabtree | |
| 9,621,959 B2 | 4/2017 | Mountain | |
| 9,628,286 B1 | 4/2017 | Nguyen et al. | |
| 9,632,746 B2 | 4/2017 | Keipert et al. | |
| 9,633,186 B2 | 4/2017 | Ingrassia, Jr. et al. | |
| 9,729,989 B2 | 8/2017 | Marten | |
| 9,769,522 B2 | 9/2017 | Richardson | |
| 9,772,612 B2 | 9/2017 | McCarthy et al. | |
| 9,798,309 B2 | 10/2017 | Tirpak | |
| 9,824,578 B2 | 11/2017 | Burton et al. | |
| 9,835,434 B1 | 12/2017 | Sloo et al. | |
| 9,838,736 B2 | 12/2017 | Smith et al. | |
| 9,882,736 B2 | 1/2018 | Lett | |
| 9,900,177 B2 | 2/2018 | Holley | |
| 2001/0012998 A1 | 8/2001 | Jouet et al. | |
| 2002/0003493 A1 | 1/2002 | Durst et al. | |
| 2002/0019725 A1 | 2/2002 | Petite | |
| 2002/0063633 A1 | 5/2002 | Park | |
| 2002/0080238 A1 | 6/2002 | Ohmura | |
| 2002/0193989 A1 | 12/2002 | Geilhufe et al. | |
| 2003/0005431 A1 | 1/2003 | Shinohara | |
| 2003/0052789 A1 | 3/2003 | Colmenarez et al. | |
| 2003/0097452 A1 | 5/2003 | Kim et al. | |
| 2003/0126593 A1 | 7/2003 | Mault | |
| 2003/0133551 A1 | 7/2003 | Kahn | |
| 2003/0140352 A1 | 7/2003 | Kim | |
| 2003/0154242 A1 | 8/2003 | Hayes et al. | |
| 2003/0192600 A1 | 10/2003 | Ford | |
| 2003/0201900 A1 | 10/2003 | Bachinski et al. | |
| 2004/0019489 A1 | 1/2004 | Funk et al. | |
| 2004/0036579 A1 | 2/2004 | Megerle | |
| 2004/0117038 A1 | 6/2004 | Karaoguz et al. | |
| 2004/0117843 A1 | 6/2004 | Karaoguz et al. | |
| 2004/0121725 A1 | 6/2004 | Matsui | |
| 2004/0128034 A1 | 7/2004 | Lenker et al. | |
| 2004/0143838 A1 | 7/2004 | Rose | |
| 2004/0148419 A1 | 7/2004 | Chen et al. | |
| 2004/0148632 A1 | 7/2004 | Park et al. | |
| 2004/0260407 A1 | 12/2004 | Wimsatt | |
| 2004/0266419 A1 | 12/2004 | Arling et al. | |
| 2005/0038875 A1 | 2/2005 | Park | |
| 2005/0049862 A1 | 3/2005 | Choi et al. | |
| 2005/0106267 A1 | 5/2005 | Frykman et al. | |
| 2005/0159823 A1 | 7/2005 | Hayes et al. | |
| 2005/0188315 A1 | 8/2005 | Campbell et al. | |
| 2005/0200478 A1 | 9/2005 | Koch et al. | |
| 2005/0245292 A1 | 11/2005 | Bennett et al. | |
| 2005/0252622 A1 | 11/2005 | Reid | |
| 2005/0264698 A1 | 12/2005 | Eshleman | |
| 2005/0289614 A1 | 12/2005 | Baek et al. | |
| 2006/0011145 A1 | 1/2006 | Kates | |
| 2006/0059977 A1 | 3/2006 | Kates | |
| 2006/0087428 A1 | 4/2006 | Wolfe et al. | |
| 2006/0115156 A1 | 6/2006 | Nakajima et al. | |
| 2006/0136968 A1 | 6/2006 | Han et al. | |
| 2006/0143679 A1 | 6/2006 | Yamada et al. | |
| 2006/0155389 A1 | 7/2006 | Pessolano et al. | |
| 2006/0186740 A1 | 8/2006 | Von Gunten | |
| 2006/0192680 A1 | 8/2006 | Scuka et al. | |
| 2006/0244624 A1 | 11/2006 | Wang et al. | |
| 2006/0253894 A1 | 11/2006 | Bookman et al. | |
| 2007/0044119 A1 | 2/2007 | Sullivan et al. | |
| 2007/0078910 A1 | 4/2007 | Bopardikar | |
| 2007/0129220 A1 | 6/2007 | Bardha | |
| 2007/0135225 A1 | 6/2007 | Nieminen et al. | |
| 2007/0142022 A1 | 6/2007 | Madonna et al. | |
| 2007/0146545 A1 | 6/2007 | Iwahashi | |
| 2007/0150460 A1 | 6/2007 | Evans | |
| 2007/0157258 A1 | 7/2007 | Jung et al. | |
| 2007/0192486 A1 | 8/2007 | Wilson et al. | |
| 2007/0194922 A1 | 8/2007 | Nathan et al. | |
| 2007/0256085 A1 | 11/2007 | Reckamp et al. | |
| 2007/0271518 A1 | 11/2007 | Tischer et al. | |
| 2007/0275670 A1 | 11/2007 | Chen et al. | |
| 2007/0279244 A1 | 12/2007 | Haughawout et al. | |
| 2007/0280504 A1 | 12/2007 | Badawy et al. | |
| 2008/0019392 A1 | 1/2008 | Lee | |
| 2008/0021971 A1 | 1/2008 | Halgas | |
| 2008/0022322 A1 | 1/2008 | Grannan et al. | |
| 2008/0046930 A1 | 2/2008 | Smith et al. | |
| 2008/0062258 A1 | 3/2008 | Bentkovski et al. | |
| 2008/0062965 A1 | 3/2008 | Silva et al. | |
| 2008/0092199 A1 | 4/2008 | McCarthy et al. | |
| 2008/0109095 A1 | 5/2008 | Braithwaite et al. | |
| 2008/0114963 A1 | 5/2008 | Cannon et al. | |
| 2008/0120639 A1 | 5/2008 | Walter et al. | |
| 2008/0123825 A1 | 5/2008 | Abramson et al. | |
| 2008/0140736 A1 | 6/2008 | Jarno | |
| 2008/0144884 A1 | 6/2008 | Habibi | |
| 2008/0163330 A1 | 7/2008 | Sparrell | |
| 2008/0179053 A1 | 7/2008 | Kates | |
| 2008/0236214 A1* | 10/2008 | Han | E05B 47/0012 |
| | | | 70/129 |
| 2008/0278635 A1 | 11/2008 | Hardacker et al. | |
| 2008/0284905 A1 | 11/2008 | Chuang | |
| 2008/0288876 A1 | 11/2008 | Fleming | |
| 2008/0297660 A1 | 12/2008 | Shioya | |
| 2009/0023554 A1 | 1/2009 | Shim | |
| 2009/0027225 A1 | 1/2009 | Farley | |
| 2009/0033505 A1 | 2/2009 | Jones et al. | |
| 2009/0040013 A1 | 2/2009 | Ebrom et al. | |
| 2009/0066320 A1* | 3/2009 | Posey | E05B 63/0017 |
| | | | 324/207.13 |
| 2009/0069038 A1 | 3/2009 | Olague et al. | |
| 2009/0083374 A1 | 3/2009 | Saint Clair | |
| 2009/0112541 A1 | 4/2009 | Anderson et al. | |
| 2009/0138507 A1 | 5/2009 | Burckart et al. | |
| 2009/0146834 A1 | 6/2009 | Huang | |
| 2009/0165069 A1 | 6/2009 | Kirchner | |
| 2009/0167555 A1 | 7/2009 | Kohanek | |
| 2009/0190040 A1 | 7/2009 | Watanabe et al. | |
| 2009/0235992 A1 | 9/2009 | Armstrong | |
| 2009/0249428 A1 | 10/2009 | White et al. | |
| 2009/0270065 A1 | 10/2009 | Hamada et al. | |
| 2009/0271203 A1 | 10/2009 | Resch et al. | |
| 2009/0286654 A1 | 11/2009 | Rice | |
| 2009/0307715 A1 | 12/2009 | Santamaria et al. | |
| 2010/0031286 A1 | 2/2010 | Gupta et al. | |
| 2010/0045471 A1 | 2/2010 | Meyers | |
| 2010/0046918 A1 | 2/2010 | Takao et al. | |
| 2010/0066507 A1 | 3/2010 | Myllymaki | |
| 2010/0083371 A1 | 4/2010 | Bennetts et al. | |
| 2010/0097225 A1 | 4/2010 | Petricoin, Jr. | |
| 2010/0102082 A1 | 4/2010 | Ebrom et al. | |
| 2010/0122284 A1 | 5/2010 | Yoon et al. | |
| 2010/0131280 A1 | 5/2010 | Bogineni | |
| 2010/0138007 A1 | 6/2010 | Clark et al. | |
| 2010/0138858 A1 | 6/2010 | Velazquez et al. | |
| 2010/0146445 A1 | 6/2010 | Kraut | |
| 2010/0161082 A1 | 6/2010 | Ebrom et al. | |
| 2010/0164732 A1 | 7/2010 | Wedig et al. | |
| 2010/0211546 A1 | 8/2010 | Grohman et al. | |
| 2010/0277300 A1 | 11/2010 | Cohn et al. | |
| 2010/0283579 A1* | 11/2010 | Kraus | G07C 9/00944 |
| | | | 340/5.7 |
| 2010/0309004 A1 | 12/2010 | Grundler et al. | |
| 2010/0321151 A1 | 12/2010 | Matsuura et al. | |
| 2011/0003665 A1 | 1/2011 | Burton et al. | |
| 2011/0018693 A1 | 1/2011 | Lim et al. | |
| 2011/0030016 A1 | 2/2011 | Pino et al. | |
| 2011/0032423 A1 | 2/2011 | Jing et al. | |
| 2011/0093126 A1 | 4/2011 | Toba et al. | |
| 2011/0119325 A1 | 5/2011 | Paul et al. | |
| 2011/0139076 A1 | 6/2011 | Pu et al. | |
| 2011/0140832 A1 | 6/2011 | Vinkenvleugel et al. | |
| 2011/0150432 A1 | 6/2011 | Paul et al. | |

(56) References Cited

U.S. PATENT DOCUMENTS

| | | |
|---|---|---|
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1* | 7/2012 | Sharma .............. G01B 7/31 70/280 |
| 2012/0206269 A1* | 8/2012 | Wickman .......... H05B 37/0227 340/686.6 |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0166073 A1 | 6/2013 | Pine et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0242074 A1 | 9/2013 | Sekiguchi et al. |
| 2013/0247117 A1 | 9/2013 | Yamada et al. |
| 2013/0249688 A1 | 9/2013 | Nguyen et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0022051 A1 | 1/2014 | Levien et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0129006 A1 | 5/2014 | Chen et al. |
| 2014/0135993 A1 | 5/2014 | Kang et al. |
| 2014/0140575 A1 | 5/2014 | Wolf |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0297001 A1 | 10/2014 | Silverman |
| 2014/0306833 A1 | 10/2014 | Ricci |
| 2014/0310075 A1 | 10/2014 | Ricci |
| 2014/0313014 A1 | 10/2014 | Huh et al. |
| 2014/0313032 A1 | 10/2014 | Sager et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1 | 3/2015 | Hwang et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1 | 4/2015 | Slupik et al. |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemulapalli |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0304689 A1 | 10/2015 | Warren |

(56) References Cited

U.S. PATENT DOCUMENTS

| | | |
|---|---|---|
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0041565 A1 | 2/2016 | Edwards |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1 | 6/2016 | Peterson et al. |
| 2016/0191912 A1 | 6/2016 | Lea et al. |
| 2016/0191990 A1 | 6/2016 | McCarthy |
| 2016/0195856 A1 | 7/2016 | Spero |
| 2016/0196731 A1 | 7/2016 | Aich et al. |
| 2016/0203700 A1 | 7/2016 | Bruhn et al. |
| 2016/0234034 A1 | 8/2016 | Mahar et al. |
| 2016/0248598 A1 | 8/2016 | Lin et al. |
| 2016/0256485 A1 | 9/2016 | Wager et al. |
| 2016/0260135 A1 | 9/2016 | Zomet et al. |
| 2016/0285644 A1 | 9/2016 | Lu et al. |
| 2016/0286327 A1 | 9/2016 | Marten |
| 2016/0323548 A1 | 11/2016 | Khot et al. |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0065433 A1 | 1/2017 | Gould et al. |
| 2017/0041886 A1 | 2/2017 | Baker et al. |
| 2017/0048476 A1 | 2/2017 | Freiin von Kapri et al. |
| 2017/0051925 A1 | 2/2017 | Stefanski et al. |
| 2017/0054615 A1 | 2/2017 | Wilson |
| 2017/0082987 A1 | 3/2017 | Reddy et al. |
| 2017/0127124 A9 | 5/2017 | Wilson et al. |
| 2017/0146964 A1 | 5/2017 | Beals |
| 2017/0168469 A1 | 6/2017 | Marten et al. |
| 2017/0176961 A1 | 6/2017 | Tirpak |
| 2017/0187993 A1 | 6/2017 | Martch et al. |
| 2017/0191693 A1 | 7/2017 | Bruhn et al. |
| 2017/0191695 A1 | 7/2017 | Bruhn et al. |
| 2017/0195130 A1 | 7/2017 | Landow et al. |
| 2018/0027290 A1 | 1/2018 | Richardson |
| 2018/0038029 A1 | 2/2018 | Beals |
| 2018/0061158 A1 | 3/2018 | Greene |

FOREIGN PATENT DOCUMENTS

| | | | | |
|---|---|---|---|---|
| CN | 105814555 A | | 7/2016 | |
| DE | 3707284 A1 | * | 9/1988 | ......... E05B 47/0012 |
| DE | 4012253 C1 | * | 4/1991 | ............. E05B 17/22 |
| DE | 10208451 A1 | * | 9/2003 | ............. E05B 45/06 |
| DE | 102012106719 A1 | * | 1/2014 | ............. E05B 41/00 |
| EP | 0720136 A2 | * | 7/1996 | ........... E05B 45/083 |
| EP | 0743410 A2 | * | 11/1996 | ........... E05B 45/083 |
| EP | 2 736 027 A1 | | 5/2014 | |
| EP | 3 080 677 A1 | | 10/2016 | |
| EP | 3 080 710 A1 | | 10/2016 | |
| FR | 834856 A | * | 12/1938 | ........... E05B 45/083 |
| FR | 947943 A | * | 7/1949 | ........... E05B 45/083 |
| GB | 1445705 A | * | 8/1976 | ........... E05B 45/086 |
| GB | 2 304 952 A | | 3/1997 | |
| JP | 2008148016 A | | 6/2008 | |
| WO | 93/20544 A1 | | 10/1993 | |
| WO | 2004/068386 A1 | | 8/2004 | |
| WO | 2011/095567 A1 | | 8/2011 | |
| WO | 2011/149473 A1 | | 12/2011 | |
| WO | 2014/068556 A1 | | 5/2014 | |
| WO | 2015/179120 A1 | | 11/2015 | |
| WO | 2016/034880 A1 | | 3/2016 | |
| WO | 2016/066399 A1 | | 5/2016 | |
| WO | 2016/066442 A1 | | 5/2016 | |
| WO | 2016/182696 A1 | | 11/2016 | |
| WO | 2017/116533 A1 | | 7/2017 | |
| WO | 2018/039161 A1 | | 3/2018 | |

OTHER PUBLICATIONS

Author Unknown, "AllJoyn Onboarding Service Frameworks," Qualcomm Connected Experiences, Inc., accessed on Jul. 15, 2014, 9 pages. Retrieved from https://www.alljoyn.org.

Author Unknown, "App for Samsung Smart TV®," Crestron Electronics, Inc., accessed on Jul. 14, 2014, 3 pages. Retrieved from http://www.crestron.com/products/smart tv television apps/.

Author Unknown, "Do you want to know how to find water leaks? Use a Bravedo Water Alert Flow Monitor to find out!", Bravedo.com, accessed Dec. 16, 2014, 10 pages. Retrieved from http://bravedo.com/.

Author Unknown, "Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.

Author Unknown, "International Building Code Excerpts, Updated with recent code changes that impact electromagnetic locks," Securitron, Assa Abloy, 2007, 2009,2 pages.Retrieved from: www.securitron.com/Other/.../New_IBC-IFC_Code_Language.pdf.

Author Unknown, "Introduction to Ultrasonic Doppler Flowmeters," Omega Engineering inc., accessed on Dec. 16, 2014, 3 pages. Retrieved from http://www.omega.com/prodinfo/ultrasonicflowmeters.html.

Author Unknown, "Ultrasonic Flow Meters," RS Hydro Ltd, accessed on Dec. 16, 2014, 3 pages. Retrieved from http://www.rshydro.co.uk/ultrasonic-flowmeter.shtml.

Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.

International Search Report and Written Opinion for PCT/US2014/055476 dated Dec. 30, 2014, 10 pages.

International Search Report and Written Opinion of PCT/EP2011/051608 dated May 30, 2011, 13 pages.

International Preliminary Report on Patentability for PCT/EP2011/051608 dated Aug. 16, 2012, 8 pages.

Mexican Institute of Industrial Property Office Action dated Nov. 1, 2013, for Mex. Patent Appln No. MX/a/2012/008882 is not translated into English, 3 pages.

International Search Report and Written Opinion of PCT/US2014/053876 dated Nov. 26, 2014, 8 pages.

International Search Report and Written Opinion of PCT/US2014/055441 dated Dec. 4, 2014, 10 pages.

Lamonica, M., "CES 2010 Preview: Green comes in many colors," retrieved from CNET.com (http://ces.cnet.com/8301-31045_1-10420381-269.html), Dec. 22, 2009, 2 pages.

Robbins, Gordon, Deputy Chief, "Addison Fire Department Access Control Installation," 2006 International Fire Code, Section 1008.1.3.4, 4 pages.

Wang et al., "Mixed Sound Event Verification on Wireless Sensor Network for Home Automation," IEEE Transactions on Industrial Informatics, vol. 10, No. 1, Feb. 2014, 10 pages.

U.S. Appl. No. 12/700,310, filed Feb. 4, 2010, Office Action dated May 4, 2012, 15 pages.

U.S. Appl. No. 12/700,310, filed Feb. 4, 2010, Final Office Action dated Oct. 10, 2012, 16 pages.

U.S. Appl. No. 12/700,310, filed Feb. 4, 2010, Non-Final Office Action dated Apr. 1, 2013, 16 pages.

U.S. Appl. No. 12/700,310, filed Feb. 4, 2010, Non-Final Office Action dated Oct. 15, 2013, 15 pages.

(56) References Cited

OTHER PUBLICATIONS

U.S. Appl. No. 12/700,310, filed Feb. 4, 2010, Final Office Action dated Feb. 28, 2014, 17 pages.
U.S. Appl. No. 12/700,310, filed Feb. 4, 2010, Non-Final Office Action dated Aug. 14, 2014, 18 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012,Final Office Action dated Feb. 10, 2014, 13 pages.
U.S. Appl. No. 13/680,934, filed Nov. 19, 2012, Notice of Allowance dated Apr. 30, 2014, 9 pages.
U.S. Appl. No. 13/680,934, filed Nov. 19, 2012, Notice of Allowance dated Jul. 25, 2014, 12 pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015, Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
International Preliminary Report on Patentability for PCT/US2014/055476 dated Jun. 14, 2016, 9 pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of Brazilian Application No. BR 11 2016 0112032 dated Aug. 8, 2017, 2 pages.
Supplementary European Search Report for EP 14868928 dated Jul. 7, 2017, 11 pages.
Mexican Institute of Industrial Property Notice of Allowance dated Feb. 10, 2014, for Mex. Patent Appln No. MX/a/2012/008882, 1 page.
U.S. Appl. No. 12/700,310, filed Feb. 4, 2010 Non-Final Office Action dated Mar. 11, 2015, 35 pages.
U.S. Appl. No. 14/107,132, filed Dec. 16, 2013 Non Final Office Action dated May 27, 2015, 26 pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
U.S. Appl. No. 14/470,352, filed Aug. 27, 2014 Non Final Office Action dated Nov. 20, 2015, 28 pages.
International Search Report and Written Opinion for PCT/GB2015/052457 dated Nov. 13, 2015, 11 pages.
U.S. Appl. No. 12/700,310, filed Feb. 4, 2010 Final Office Action dated Oct. 26, 2015, 19 pages.
U.S. Appl. No. 14/107,132, filed Dec. 16, 2013, Final Rejection dated Dec. 16, 2015, 32 pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
Bdejong_Cree, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.

(56) References Cited

OTHER PUBLICATIONS

International Search Report and Written Opinion for PCT/EP2015/073299 dated Jan. 4, 2016, 12 pages.
International Search Report and Written Opinion for PCT/EP2015/073936 dated Feb. 4, 2016, all pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
Notification of Publication of European Application No. 15763643.2 as EP 3189511 dated Jul. 12, 2017, 1 page.
Notification of Publication of Brazilian Application No. BR 11 2016 010376 9 dated Aug. 8, 2017, 1 page.
Supplementary European Search Report for EP 14870507 dated Jun. 28, 2017, all pages.
"Plug-In Carbon Monoxide & Natural Gas Alarm with Backup Battery Protection," Universal Security Instruments, Inc., 2011, 12 pages.

Mark Edward Soper, "Absolute Beginner's Guide to Home Automation," 2005, Que Publishing, p. 57, 121.
U.S. Appl. No. 14/982,366, filed Dec. 29, 2015, Non-Final Rejection dated Nov. 1, 2017, all pages.
U.S. Appl. No. 15/246,079, filed Aug. 24, 2016, Non-Final Rejection dated Oct. 19, 2017, all pages.
U.S. Appl. No. 14/485,188, filed Sep. 12, 2014, Final Rejection dated Oct. 25, 2017, all pages.
U.S. Appl. No. 14/485,038, filed Sep. 12, 2014, Notice of Allowance dated Nov. 13, 2017, all pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/528,402, filed Oct. 30, 2014, Final Rejection dated Oct. 31, 2017, all pages.
U.S. Appl. No. 14/981,501, filed Dec. 28, 2015, Final Office Action dated Oct. 10, 2017, all pages.
International Preliminary Report on Patentability for PCT/US2016/028126 dated Nov. 14, 2017, all pages.
International Search Report and Written Opinion for PCT/US2017/047900 dated Nov. 24, 2017.
Ravindran, et al., "Information-centric Networking based Homenet," 2013 IFIP/IEEE International Symposium on Integrated Network Management (IM 2013), Ghent, 2013, pp. 1102-1108.
Mantoro, et al., "Web-enabled Smart Home Using Wireless Node Infrastructure," Proceedings of the 9th International Conference on Advances in Mobile Computing and Multimedia. ACM, 2011, pp. 72-79.
Shariqsuhail, et al., "Multi-Functional Secured Smart Home," Advances in Computing, Communications and Informatics (ICACCI), 2016 International Conference on. IEEE, 2016, pp. 2629-2634.
U.S. Appl. No. 14/986,483, filed Dec. 31, 2015, Non-Final Rejection dated Dec. 1, 2017, all pages.
U.S. Appl. No. 14/584,075, filed Dec. 29, 2014, Notice of Allowance dated Dec. 26, 2017, all pages.
U.S. Appl. No. 14/710,331, filed May 12, 2015, Notice of Allowance dated Dec. 7, 2017, all pages.
U.S. Appl. No. 14/832,821, filed Aug. 21, 2015, Notice of Allowance dated Dec. 18, 2017, all pages.
Office Action CN Appln No. 201480067003.5 dated Jan. 19, 2018, all pages.
U.S. Appl. No. 14/952,580, filed Nov. 25, 2015, Notice of Allowance dated Feb. 12, 2018, all pages.
U.S. Appl. No. 14/528,402, filed Oct. 30, 2014, Notice of Allowance dated Jan. 29, 2018, all pages.
U.S. Appl. No. 14/970,235 Non Final Rejection dated Jan. 31, 2018, all pages.

* cited by examiner

INTEGRATED DOOR LOCKING AND STATE DETECTION SYSTEMS AND METHODS

CROSS-REFERENCES TO RELATED APPLICATIONS

This application claims priority to U.S. Provisional Application No. 61/914,856, filed Dec. 11, 2013, entitled "Methods and Systems for Home Automation," the entire disclosure of which is hereby incorporated by reference.

BACKGROUND

Home automation systems frequently offer the ability to lock and unlock doors. While a lock of a door may be engaged or disengaged remotely, it may not be possible to determine if the door is shut or open. If the lock is engaged while the door is open, the lock is effectively useless because it will not prevent egress through the open door.

SUMMARY

In some embodiments, an integrated door lock and position sensor system may be presented. The system may include a housing for installation to a door. The system may include a wireless interface, housed within the housing, configured to wirelessly communicate with one or more remote computerized devices. The system may include a sensor that detects when the door is closed. The system may include a lock that, when engaged and the door is closed, prevents the door from being opened from at least one side of the door. The system may include a controller, housed within the housing, in communication with the sensor, the lock. The controller may be configured to receive information from the sensor that indicates whether the door is open or shut. The controller may be configured to transmit, via the wireless interface, information indicative of whether the door is open or shut. The controller may be configured to determine whether the lock is engaged or disengaged. The controller may be configured to transmit, via the wireless interface, information indicative of whether the lock is engaged or disengaged.

Embodiments of such a device may include one or more of the following features: The device may include a trim plate. The sensor may be a strikeplate sensor that detects whether a strikeplate affixed to a door frame is detected. The strikeplate sensor and the lock may interface with the strikeplate through the trim plate. The device may include the strikeplate, external to the housing, for mounting to the door frame, wherein the strikeplate is magnetized and the strikeplate sensor comprises a reed switch that detects a magnetic field produced by the strikeplate. The strikeplate sensor may include a proximity sensor for detecting when the strikeplate is within a predefined distance of the proximity sensor. The system may include a single power source, comprising a battery, housed within the housing, configured to power the wireless interface, the sensor, the lock, and the controller. The lock may include a deadbolt that extends through a strikeplate into a channel of a door frame when the lock is engaged. The sensor may be within the deadbolt such that the sensor, when the lock is engaged, detects whether the door is closed by detecting the channel of the door frame. The integrated door lock and position sensor device may include a plurality of sensors that comprises the sensor and a second sensor. The second sensor may be within the deadbolt such that the second sensor, when the lock is engaged, detects whether the door is closed by detecting a second portion of the channel of the door frame. The sensor and the second sensor may be plunger sensors, proximity sensors, or a mix of the two types. The lock may include a deadbolt that extends through a strikeplate into a channel of a door frame when the lock is engaged. The sensor may be a plunger sensor within the deadbolt such that the sensor, when the lock is engaged, detects whether the door is closed by detecting an end of the channel of the door frame. The integrated door lock and position sensor device may include a channel plate The lock may include a deadbolt that extends through a strikeplate into a channel of a door frame when the lock is engaged. The sensor may be within the deadbolt such that the sensor, when the lock is engaged, detects a magnetized channel plate located at an end of the channel when the door is closed. The sensor may include a reed switch that detects the magnetized channel plate located at the end of the channel when the door is closed and the lock is engaged. The controller may receive a message via the wireless interface. The controller may engage the lock in response to the message.

In some embodiments, a method for sensing a door state is presented. The method may include receiving, by a controller within a housing, information from a sensor located within the housing that indicates whether a door is open or shut. The method may include transmitting, via a wireless interface within the housing and in communication with the controller, information indicative of whether the door is open or shut. The method may include determining, by the controller, whether a lock is engaged or disengaged. The method may include transmitting, via the wireless interface, information indicative of whether the lock is engaged or disengaged.

Embodiments of such a method may include one or more of the following features: Transmitting the information indicative of whether the door is open or shut and transmitting the information indicate of whether the lock is engaged or disengaged may be in the form of a single message. The method may include monitoring the door state for a change in the whether the lock is engaged or disengaged and whether the door is open or shut. The method may include receiving, by the controller, via the wireless interface, a message. The method may include engaging, by the controller, the lock in response to the message. The method may include receiving, by the controller, via the wireless interface, a message. The method may include disengaging, by the controller, the lock in response to the message.

In some embodiments, an integrated door lock and position sensor apparatus. A housing means configured to be installed on a door may be present. Such a housing means may be a metal (or other material) enclosure designed to house components of the apparatus. The apparatus may include a wireless interface means, housed within the housing means, configured to wirelessly communicate with one or more remote computerized devices. The wireless interface means may include one or more integrated circuits and antennas configured to communicate via one or more wireless communication protocols. The apparatus may include sensing means that detects when the door is closed. The sensing means may include one or more sensors, such as proximity sensors, reed sensor, and/or plunger sensors. The apparatus may include a locking means that, when engaged and the door is closed, prevents the door from being opened from at least one side of the door. Such a locking means may be in the form of a deadbolt or locking latch. The apparatus may include a processing means, located within the housing means, in communication with the sensing means, the locking means, and the wireless interface means. The processing means may include one or more processors (i.e., controllers) configured to perform functions such as: receive information from the sensing means that indicates whether the door is open or shut; and determine whether the locking means is engaged or disengaged based on information received from the locking means.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ability to remotely lock and unlock a door and the ability to remotely determine whether a door is locked or unlocked can be useful. However, that usefulness is blunted if there is no way of knowing whether a door is physically closed or open. A door that is open and locked may be of little use because the door does not serve to secure entrance or egress. For instance, a remotely-operated door lock that indicates only whether the lock is engaged or disengaged may not provide sufficient information to a user to determine if a door is closed and locked because a person, for example, could have left the door ajar. As such, a single device that can lock and unlock the door and provide an accurate status indication of whether the door is open or shut may be significantly more useful. For instance, a remote user can have peace of mind that a location is secure when the door's state is reported as both locked and closed.

Embodiments detailed herein present a single device that can be installed on a door that permits remote management of a lock and sensing of a door's state. A sensor that senses whether the door is open or shut may be integrated into the device such that a single power supply, such as one or more batteries, are used to both control the lock and sense the door position. Further, since the sensor is incorporated directly into the lock unit, no hardware (in addition to a strike plate) may be needed to be installed in the door or door frame. Such a device may require no modifications to a conventional door and may use a conventional door frame and strike plate.

Figure 1:
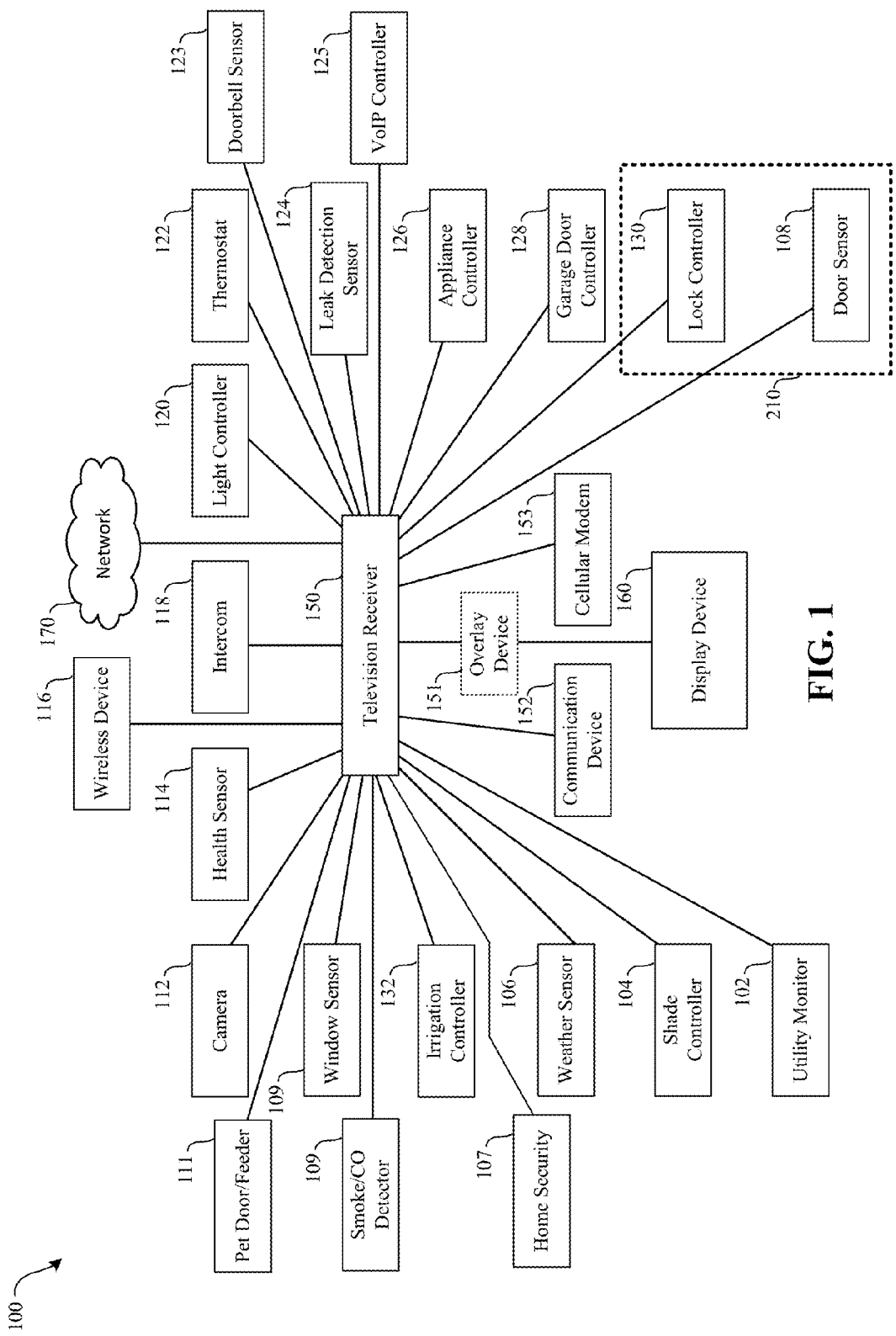
FIG. 1 illustrates an embodiment of a home automation system.

A door lock and sensor unit may be installed as part of a home automation system. A home automation system allows for reporting of the states of one or more devices capable of wireless communication (e.g., via a network) within a location, such as a home or office. Such a home automation system may be coordinated by a central host device. Via the central host device, a user can check the status of various home automation devices and change the state of at least some of such home automation devices. FIG. 1 illustrates an embodiment of a home automation system 100 hosted by a television receiver. Television receiver 150 may be configured to receive television programming from a satellite-based television service provider; in other embodiments other forms of television service provider networks may be used, such as an IP-based network (e.g., fiber network), a cable based network, a wireless broadcast-based network, etc.

Television receiver 150 may be configured to communicate with multiple in-home home automation devices. The devices with which television receiver 150 communicates may use different communication standards. For instance, one or more devices may use a ZigBee® communication protocol while one or more other devices communicate with the television receiver using a Z-Wave® communication protocol. Other forms of wireless communication may be used by devices and the television receiver. For instance, television receiver 150 and one or more devices may be configured to communicate using a wireless local area network, which may use a communication protocol such as IEEE 802.11.

In some embodiments, a separate device may be connected with television receiver 150 to enable communication with home automation devices. For instance, communication device 152 may be attached to television receiver 150. Communication device 152 may be in the form of a dongle. Communication device 152 may be configured to allow for Zigbee®, Z-Wave®, and/or other forms of wireless communication. The communication device may connect with television receiver 150 via a USB port or via some other type of (wired) communication port. Communication device 152 may be powered by the television receiver or may be separately coupled with a power source. In some embodiments, television receiver 150 may be enabled to communicate with a local wireless network and may use communication device 152 in order to communicate with devices that use a ZigBee® communication protocol, Z-Wave® communication protocol, and/or some other home wireless communication protocols.

Communication device 152 may also serve to allow additional components to be connected with television receiver 150. For instance, communication device 152 may include additional audio/video inputs (e.g., HDMI), a component, and/or a composite input to allow for additional devices (e.g., Blu-ray players) to be connected with television receiver 150. Such connection may allow video from such additional devices to be overlaid with home automation information. Whether home automation information is overlaid onto video may be triggered based on a user's press of a remote control button.

Regardless of whether television receiver 150 uses communication device 152 to communicate with home automation devices, television receiver 150 may be configured to output home automation information for presentation to a user via display device 160, which may be a television, monitor, or other form of device capable of presenting visual information. Such information may be presented simultaneously with television programming received by television receiver 150. Television receiver 150 may also, at a given time, output only television programming or only home automation information based on a user's preference. The user may be able to provide input to television receiver 150 to control the home automation system hosted by television receiver 150 or by overlay device 151, as detailed below.

In some embodiments, television receiver 150 may not be used as a host for a home automation system. Rather, a separate device may be coupled with television receiver 150 that allows for home automation information to be presented to a user via display device 160. This separate device may be coupled with television receiver 150. In some embodiments, the separate device is referred to as overlay device 151. Overlay device 151 may be configured to overlay information, such as home automation information, onto a signal to be visually presented via display device 160, such as a television. In some embodiments, overlay device 151 may be coupled between television receiver 150, which may be in the form of a set top box, and display device 160, which may be a television. In such embodiments, television receiver 150 may receive, decode, descramble, decrypt, store, and/or output television programming. Television receiver 150 may output a signal, such as in the form of an HDMI signal. Rather than be directly input to display device 160, the output of television receiver 150 may be input to overlay device 151. Overlay device 151 may receive the video and/or audio output from television receiver 150. Overlay device 151 may add additional information to the video and/or audio signal received from television receiver 150. The modified video and/or audio signal may be output to display device 160 for presentation. In some embodiments, overlay device 151 has an HDMI input and an HDMI output, with the HDMI output being connected to display device 160. To be clear, while FIG. 1 illustrates lines illustrating communication between television receiver 150 and various devices, it should be understood that such communication may exist, in addition or alternatively via communication device 152 and/or with overlay device 151.

In some embodiments, television receiver 150 may be used to provide home automation functionality but overlay device 151 may be used to present information via display device 160. It should be understood that the home automation functionality detailed herein in relation to a television receiver may alternatively be provided via overlay device 151. In some embodiments, overlay device 151 may provide home automation functionality and be used to present information via display device 160. Using overlay device 151 to present automation information via display device 160 may have additional benefits. For instance, multiple devices may provide input video to overlay device 151. For instance, television receiver 150 may provide television programming to overlay device 151, a DVD/Blu-Ray player may provide video overlay device 151, and a separate internet-TV device may stream other programming to overlay device 151. Regardless of the source of the video/audio, overlay device 151 may output video and/or audio that has been modified to include home automation information and output to display device 160. As such, in such embodiments, regardless of the source of video/audio, overlay device 151 may modify the audio/video to include home automation information and, possibly, solicit for user input. For instance, in some embodiments, overlay device 151 may have four video inputs (e.g., four HDMI inputs) and a single video output (e.g., an HDMI output). In other embodiments, such overlay functionality may be part of television receiver 150. As such, a separate device, such as a Blu-ray player, may be connected with a video input of television receiver 150, thus allowing television receiver 150 to overlay home automation information when content from the Blu-Ray player is being output to display device 160.

Regardless of whether television receiver 150 is itself configured to provide home automation functionality and output home automation input for display via display device 160 or such home automation functionality is provided via overlay device 151, home automation information may be presented by display device 160 while television programming is also being presented by display device 160. For instance, home automation information may be overlaid or may replace a portion of television programming (e.g., broadcast content, stored content, on-demand content, etc.) presented via display device 160.

Television receiver 150 or overlay device 151 may be configured to communicate with one or more wireless devices, such as wireless device 116. Wireless device 116 may represent a tablet computer, cellular phone, laptop computer, remote computer, or some other device through which a user may desire to control home automation settings and view home automation information. Such a device also need not be wireless, such as a desktop computer. Television receiver 150, communication device 152, or overlay device 151 may communicate directly with wireless device 116, or may use a local wireless network, such as network 170. Wireless device 116 may be remotely located and not connected with a same local wireless network. Via the internet, television receiver 150 or overlay device 151 may be configured to transmit a notification to wireless device 116 regarding home automation information. For instance, in some embodiments, a third-party notification server system, such as the notification server system operated by Apple®, may be used to send such notifications to wireless device 116.

In some embodiments, a location of wireless device 116 may be monitored. For instance, if wireless device 116 is a cellular phone, when its position indicates it has neared a door, the door may be unlocked. A user may be able to define which home automation functions are controlled based on a position of wireless device 116. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 150.

In some embodiments, little to no setup of network 170 may be necessary to permit television receiver 150 to stream data out to the Internet. For instance, television receiver 150 and network 170 may be configured, via a service such as Sling® or other video streaming service, to allow for video to be streamed from television receiver 150 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Wireless device 116 may serve as an input device for television receiver 150. For instance, wireless device 116 may be a tablet computer that allows text to be typed by a user and provided to television receiver 150. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While wireless device 116 may be used as the input device for typing text, television receiver 150 may output for display text to display device 160.

In some embodiments, a cellular modem 153 may be connected with either overlay device 151 or television receiver 150. Cellular modem 153 may be useful if a local wireless network is not available. For instance, cellular modem 153 may permit access to the internet and/or communication with a television service provider. Communication with a television service provider may also occur via a local wireless or wired network connected with the Internet. In some embodiments, information for home automation purposes may be transmitted by a television service provider system to television receiver 150 or overlay device 151 via the television service provider's distribution network, which may include the use of satellites 730, as detailed in relation to FIG. 7.

Various home automation devices may be in communication with television receiver 150 or overlay device 151. Such home automation devices may use disparate communication protocols. Such home automation devices may communicate with television receiver 150 directly or via communication device 152. Such home automation devices may be controlled by a user and/or have a status viewed by a user via display device 160 and/or wireless device 116. Home automation devices may include: smoke/carbon monoxide detector, home security system 107, pet door/feeder 111, camera 112, window sensor 109, irrigation controller 132, weather sensor 106, shade controller 104, utility monitor 102, heath sensor 114, intercom 118, light controller 120, thermostat 122, leak detection sensor 124, appliance controller 126, garage door controller 128, doorbell sensor 123, and VoIP controller 125.

Door sensor 108 and lock controller 130 may be incorporated into a single device, such as door lock and sensor unit 210, and may allow for a door's position (e.g., open or closed) to be determined and for a lock's state to be determined and changed. Door sensor 108 may transmit data to television receiver 150 (possibly via communication device 152) or overlay device 251 that indicates the status of a window or door, respectively. Such status may indicate open or closed. When a status change occurs, the user may be notified as such via wireless device 116 or display device 160. Further, a user may be able to view a status screen to view the status of one or more door sensors throughout the location. Window sensor 109 and/or door sensor 108 may have integrated glass break sensors to determine if glass has been broken. Lock controller 130 may permit a door to be locked and unlocked and/or monitored by a user via television receiver 150 or overlay device 151. No mechanical or electrical component may need to be integrated separately into a door or door frame to provide such functionality. Such a single device may have a single power source that allows for sensing of the lock position, sensing of the door position, and for engagement and disengagement of the lock.

Figure 2:
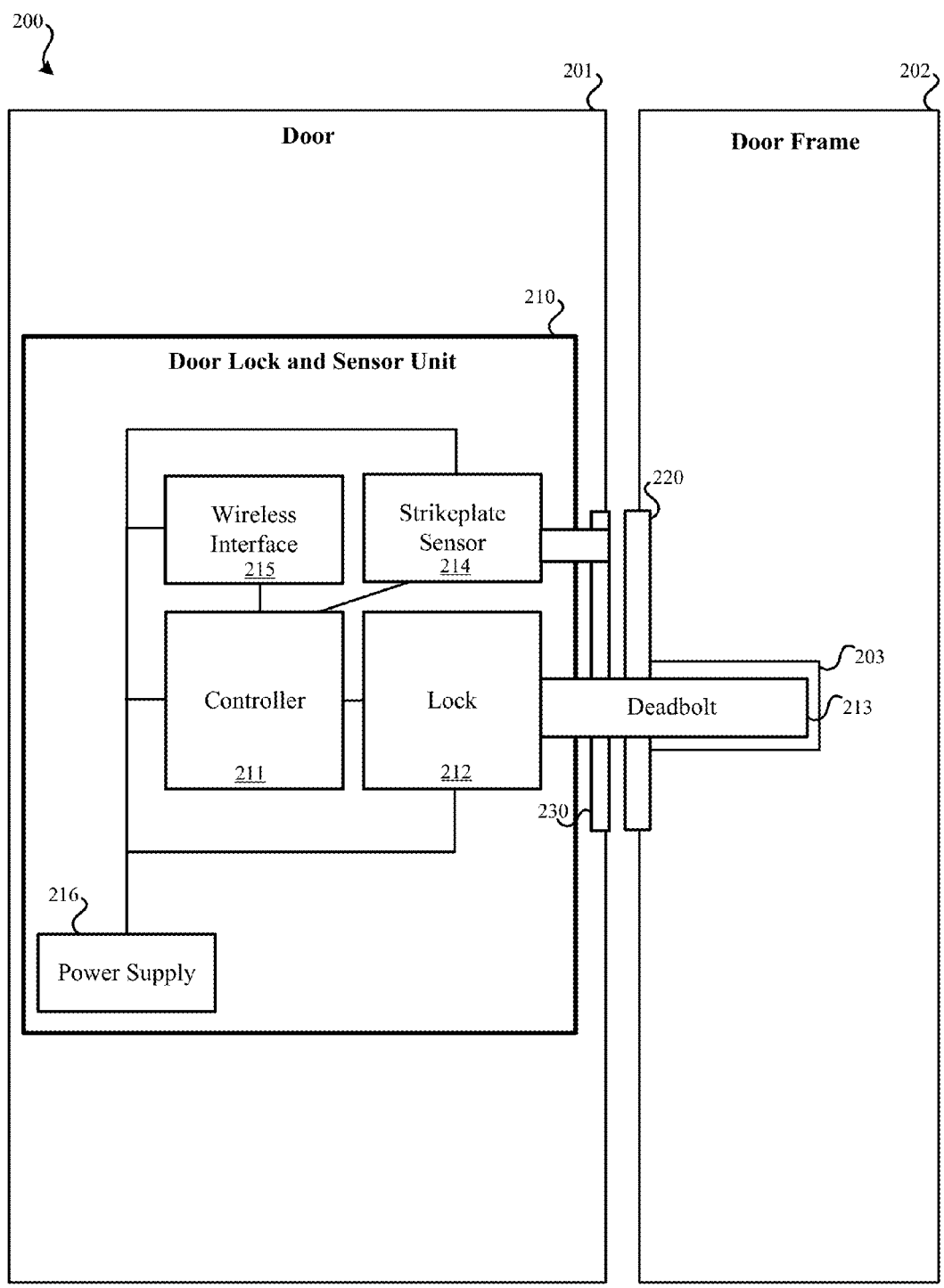
FIG. 2 illustrates an embodiment of a door locking and state detection system.

Additional forms of sensors not illustrated in FIG. 2 may also be incorporated as part of a home automation system. For instance, a mailbox sensor may be attached to a mailbox to determine when mail is present and/or has been picked up. The ability to control one or more showers, baths, and/or faucets from television receiver 150 and/or wireless device 116 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 150 when within range. For instance, when a vehicle has been parked within range of a local wireless network with which television receiver 150 is connected, video and/or audio may be transmitted from the dashcam to the television receiver for storage and/or uploading to a remote server.

To be clear, the home automation functions detailed herein that are attributed to television receiver 150 may alternatively or additionally be incorporated into overlay device 151 or some separate computerized home automation host system.

FIG. 2 illustrates an embodiment of door locking and state detection system 200, which includes door lock and sensor unit 210, of FIG. 1. Door locking and state detection system 200 may be installed on door 201. When shut, door 201 may be within door frame 202. When open, door 201 may rotate such that deadbolt 213 is not aligned with strikeplate 220 on door frame 202. Installed on door 201 may be door lock and sensor unit 210 which includes: controller 211, lock 212, deadbolt 213, strikeplate sensor 214, wireless interface 215, and power supply 216. Door locking and state detection system 200 may amount to a conventional door having a standard borehole and channel.

As an initial matter, deadbolt 213 may be in the form of either a deadbolt or a latch. A deadbolt is typically fully retracted when disengaged and is typically only extended to lock door 201 when door 201 is shut. If a deadbolt is extended while door 201 is open, the extended deadbolt may prevent door 201 from closing. Doors with a deadbolt also typically have a latch. A latch may typically be extended from door 201 and may permit door 201 to close even when the latch is extended. The outer edge of a latch may be angled such that when door 201 is rotated to be shut, the latch is caused to temporarily retract and then extend within strikeplate 220 to keep door 201 shut. A latch may be unlocked, such that actuation of a doorknob causes the latch to be retracted or locked such that the doorknob cannot be actuated or actuation of the doorknob does not cause the latch to retract. Embodiments may include doors that have both latches and deadbolts. In some situations, a latch cannot be locked. Rather, such doors may use a deadbolt for locking the door. In some embodiments, only a latch may be present. In other embodiments, both the deadbolt and latch can be locked. For simplicity, the following description focuses on deadbolts, but it should be understood that embodiments may be adapted to function using a latch (which is present in addition or in alternate to a deadbolt).

Controller 211 may represent a processor that is in communication with lock 212, strikeplate sensor 214, and wireless interface 215. Controller 211 may be configured to determine a state of lock 212. Controller 211 may also be configured to electronically cause lock 212 to engage and disengage. Controller 211 may also be configured to receive information from strikeplate sensor 214. Based upon the information received from strikeplate sensor 214, controller 211 may be able to determine if door 201 is shut within door frame 202 or is open. Controller 211 may be in communication with a wireless interface 215. Controller 211 may be configured to send information to wireless interface 215, such as an indication of whether door 201 is open or shut, and an indication of whether lock 212 is engaged or disengaged. Controller 211 may also be configured to respond to commands received via wireless interface 215. For instance, a command may be received to either engage or disengage lock 212. A processing means may include one or more controllers, such as controller 211.

Lock 212 may be configured to be electronically engaged and/or manually engaged. When engaged, deadbolt 213 may be extended. When disengaged, deadbolt 213 may be retracted by lock 212 such that door 201 may be opened. To manually open lock 212, the user may be permitted to actuate a mechanical component that causes deadbolt 213 to extend and retract. Lock 212 may also be capable of electrically actuating deadbolt 213 to extend and retract. Lock 212 may be able to actuate regardless of whether door 201 is open or shut. For instance, if door 201 is open, lock 212 may extend deadbolt 213. Such an occurrence may cause controller 211 to detect lock 212 is engaged (but information from strikeplate sensor 214 may indicate that door 201 is open). A locking means may include one or more deadbolts and/or one or more latches that can be locked and unlocked.

Deadbolt 213 is typically metal or other hardened material that can be extended and retracted. Deadbolt 213 may be configured to extend through strikeplate 220 into channel 203. Channel 203 may represent a cutout within door frame 202. Strikeplate 220 may contain a hole which is situated over channel 203. When engaged, deadbolt 213 may extend through the hole in strikeplate 220 into channel 203 thus causing door 201 to remain closed within door frame 202. Strikeplate 220 may be a plate of metal or other hardened material that is screwed or otherwise fastened to door frame 202. When retracted, deadbolt 213 may be flush with trim plate 230. No electronics may be present on door frame 202 that are part of door lock and sensor unit 210. As such, all active components are installed on the door 201. In some embodiments, a preexisting or stock strikeplate 220 may be used. As such, door lock and sensor unit 210 may be installed with no changes to hardware on door frame 202.

Trim plate 230 may be attached to door 201 such that trim plate 230 is opposite strikeplate 220 present on door frame 202. In some embodiments, trim plate 230 is 2¼ inches high by 1 inch wide. Door 201 may have a cutout ⅛ of an inch deep to accommodate trim plate 230 being attached. Trim plate 230 may permit deadbolt 213 to be extended and retracted. Also present on trim plate 230 may be strikeplate sensor 214. A trim plate means may be a in the form of trim plate 230.

Strikeplate sensor 214 may be configured to detect when strikeplate 220 is present. By strikeplate sensor 214 detecting strikeplate 220, it can be determined whether door 201 is shut within door frame 202 or is open. In some embodiments, strikeplate sensor 214 includes a proximity detector. The proximity detector can detect when an object is within a predefined distance of the proximity detector. For instance, the proximity detector of strikeplate sensor 214 may be configured to detect when an object is within a quarter of an inch of the proximity sensor. During normal operation, the only object that may be within a quarter of an inch of strikeplate sensor 214 may be strikeplate 220. In another embodiment, strikeplate sensor 214 may include a reed switch. A reed switch may open or close a circuit based on a magnetic field being detected. Some or all of strikeplate 220 may be magnetized such that when door 201 is closed within door frame 202, a magnetic field generated by strikeplate 220 causes the reed switch of strikeplate sensor 214 to either engage or disengage, thus providing an indication to controller 211 that door 201 is closed within door frame 202. Both lock 212 and strikeplate sensor 214 may use the same trim plate 230. That is, trim plate 230 accommodates both deadbolt 213 extending and retracting and allows strikeplate sensor 214 to detect whether strikeplate 220 is adjacent to trim plate 230. A sensor means may include one or more strikeplate sensor and/or one or more deadbolt insertion sensors (as detailed in relation to FIG. 3).

When controller 211 detects a state change, by either lock 212 or strikeplate sensor 214, controller 211 may send a message via wireless interface 215 to a remote device. Wireless interface 215 may be configured to interact with one or more types of wireless protocols, such as 802.11(a/b/g), Zigbee®, Z-Wave®, WiFi Direct®, Bluetooth® or some other communication protocol. Wireless interface 215 may also receive commands from a remote device, such as a request to lock or unlock lock 212 or a request to do a status check of the door state and the lock state. A wireless communication means may include one or more wireless interfaces, such as wireless interface 215. A wireless communication means may be incorporated with a processing means.

A single power supply 216 may be used to power controller 211, lock 212, strikeplate sensor 214, and wireless interface 215. Power supply 216 may include one or more batteries. Therefore, the same power source powers both the components used to determine the state of the door (e.g., open, shut) and control engagement and disengagement of lock 212. A power supply means may include one or more batteries and/or some other source of power, such as a solar panel or AC (alternating current) adapter.

Components of door lock and sensor unit 210 may be located partially within door 201 and (if the door opens to the outdoors) on the interior side of the door. A typical door has a borehole of approximately 2 and ⅛$^{th}$ inches to accommodate mounting of a doorknob and latch or deadbolt. From the borehole to the edge of the door adjacent to the door frame, a channel is present to accommodate a lock. This channel is typically 2⅜$^{th}$ inches or 2¾$^{th}$ inches. This borehole and channel in door 201 may be used to house some or all of door lock and sensor unit 210. For instance, in some embodiments, strikeplate sensor 214, lock 212 and deadbolt 213 (when retracted) may reside within the borehole and channel of door 201. Power supply 216, controller 211, wireless interface 215 may reside on the exterior of door 201 in the vicinity of the borehole. Door 201 may have a recessed area on the edge of door 201 adjacent to door frame 202 to accommodate trim plate 230. Typically, this area is ⅛$^{th}$ of an inch in depth. This region may be sufficient to accommodate trim plate 230 and strikeplate sensor 214.

Figure 3A:
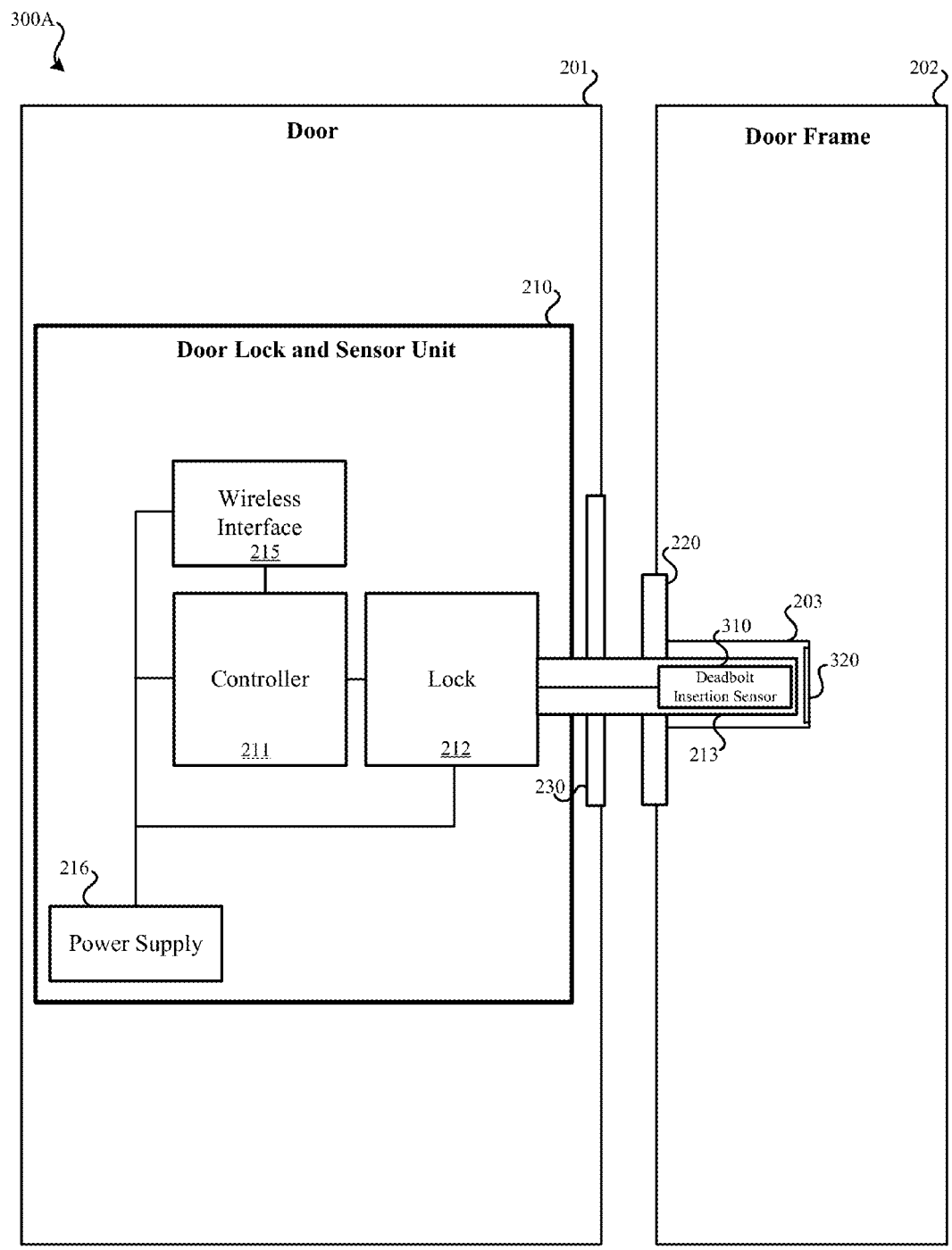
FIG. 3A illustrates another embodiment of a door locking and state detection system.

FIG. 3A illustrates an embodiment 300A of door locking and state detection system. In embodiment 300A, wireless interface 215, controller 211, and lock 212 may function similarly to as detailed in relation to embodiment 200 of FIG. 2. Such components may be at least partially contained within a housing, which may be made of a material to protect the contents, such as metal. However, rather than having a strikeplate sensor 214, a deadbolt insertion sensor 310 may be present. Deadbolt insertion sensor 310 may be integrated with the end of deadbolt 213 distal from door 201 when lock 212 is engaged. Deadbolt insertion sensor 310 may be configured to determine when deadbolt 213 is inserted in channel 203.

Deadbolt insertion sensor 310 may use one or more proximity sensors to detect when channel 203 is present. Further details regarding the placement of the one or more proximity sensors is detailed in relation to FIG. 3B. In some embodiments, deadbolt insertion sensor 310 has a plunger, such as represented in FIG. 3C. A plunger may be physically actuated when in proximity to an end (or other side) of channel 203 in door frame 202. In some embodiments, deadbolt insertion sensor 310 includes a reed switch that opens or closes in proximity to a magnetic field. Channel plate 320 may be installed by a user at the end of channel 203. Channel plate 320 may be magnetized such that the reed switch of deadbolt insertion sensor 310 is activated when proximate to channel plate 320.

Deadbolt insertion sensor 310 may have a wire or other electrical connection to controller 211 via lock 212. Deadbolt insertion sensor 310 may be able to provide controller 211 with similar information as strikeplate sensor 214. Since deadbolt 213 is retracted when door 201 is shut but unlocked, deadbolt insertion sensor 310 may not be able to detect that the door is shut when lock 212 is not engaged. However, if deadbolt insertion sensor 310 is adapted for a latch (to create a latch insertion sensor), such a sensor could be used to determine if the door is open or shut regardless of when lock 212 is engaged or disengaged because a latch can physically hold the door shut regardless of whether locked or unlocked.

Figure 3B:
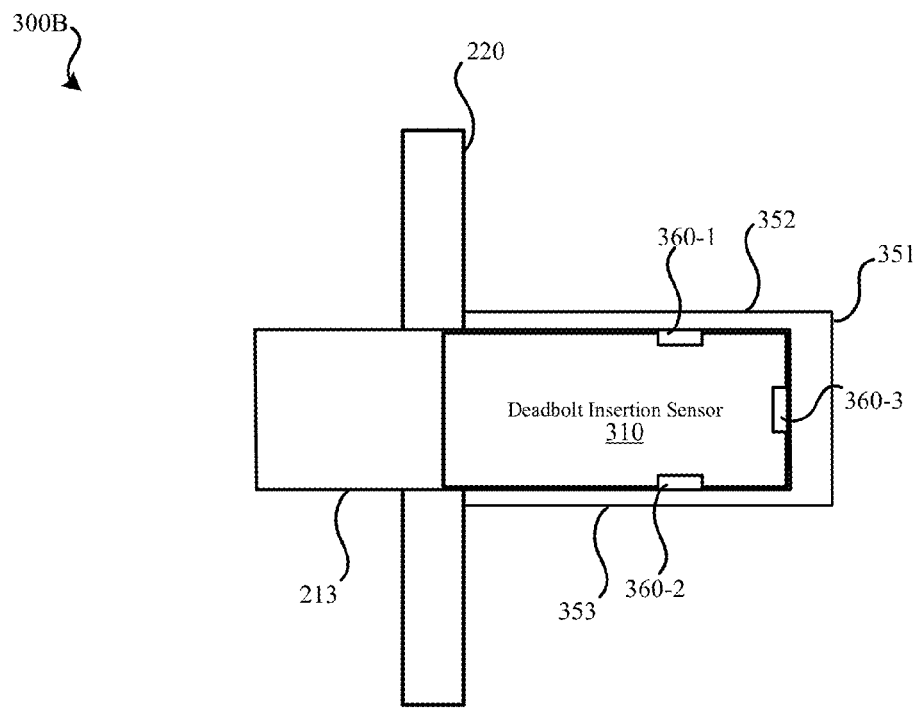
FIG. 3B illustrates an embodiment of a deadbolt insertion sensor having proximity sensors.
Figure 3C:
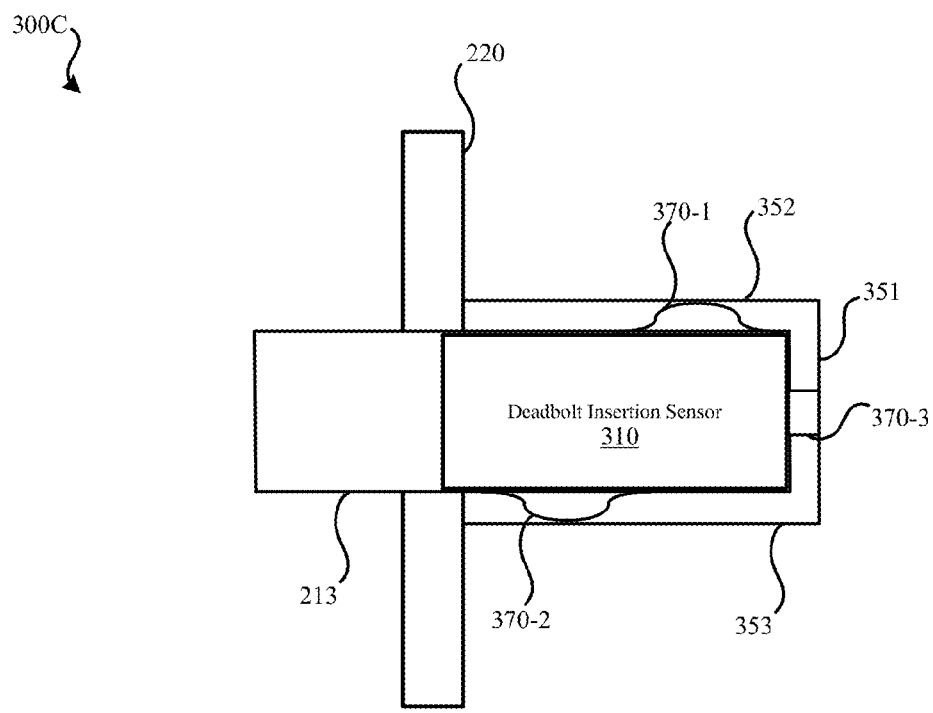
FIG. 3C illustrates an embodiment of a deadbolt insertion sensor having plunger sensors.

FIG. 3B illustrates an embodiment 300B of a deadbolt insertion sensor having proximity sensors. Embodiments may have one or more proximity sensors. In some embodiments, only proximity sensor 360-3 is present. Proximity sensor 360-3 may be used to sense end 351 of the channel. However, depending on the door frame, end 351 of the channel may be a significant distance from proximity sensor 360-3 when deadbolt 213 is fully extended. Additionally or alternatively, one or more proximity sensors (e.g., proximity sensors 360-1 and 360-2) may be present on the sides, top, and/or bottom of deadbolt 213. Such proximity sensors may allow the top 352 of the channel, bottom 353 of the channel, and/or sides of the channel to be sensed.

In some embodiments, for deadbolt insertion sensor 310 (or the controller to which it communicates) to determine that the deadbolt is engaged within the channel, all proximity sensors may be required to agree that the channel is present. In other embodiments, a majority of proximity sensors 360 may be required to agree. In still other embodiments, a training arrangement may be present, where a user engages deadbolt 213 within the channel and deadbolt insertion sensor 310 determines which portions of the channel can be detected with proximity sensors 360. For instance, information from proximity sensor 360-3 may be ignored for future assessment of whether deadbolt 213 is properly engaged because even when deadbolt 213 is fully extended within the channel during the training engagement, end 351 of the channel is not close enough to proximity sensor 360-3 to be detected. As such, the training engagement may be used to determine which proximity sensors should be used in the future for assessing whether deadbolt 213 is properly engaged within the channel.

FIG. 3C illustrates an embodiment 300C of a deadbolt insertion sensor having plunger sensors. Embodiments may have one or more plunger sensors 370. In some embodiments, only plunger sensor 370-3 is present. Plunger sensor 370-3 may be used to sense end 351 of the channel by physically being depressed by end 351 of the channel. Depending on the particular door frame, the end 351 of the channel may be a significant distance from plunger sensor 370-3 when deadbolt 213 is fully extended. Additionally or alternatively, one or more plunger sensors (e.g., plunger sensors 370-1 and 370-2) may be present on the sides, top, and/or bottom of deadbolt 213. Such plunger sensors may allow the top 352 of the channel, bottom 353 of the channel, and/or sides of the channel to be sensed by the plunger sensors being depressed by deadbolt 213 being inserted into the channel. Plunger sensors 370 may be dispersed at different locations along deadbolt 213 such that it can be determined if deadbolt 213 is fully or partially inserted within the channel. For instance, if plunger sensor 370-1 is actuated but plunger sensor 370-2 is not, this may be indicative of deadbolt 213 being only partially inserted with the channel in the door frame. A similar arrangement of sensors may be performed with proximity sensors.

In some embodiments, for deadbolt insertion sensor 310 (or the controller to which it communicates) to determine that the deadbolt is engaged within the channel, all plunger sensors may be required to agree that the channel is present. In other embodiments, a majority of plunger sensors 370 may be required to agree. In still other embodiments, a training arrangement may be present, where a user engages deadbolt 213 within the channel and deadbolt insertion sensor 310 determines which portions of the channel can be detected with plunger sensors 370. For instance, information from plunger sensor 370-3 may be ignored for future assessment of whether deadbolt 213 is properly engaged because even when deadbolt 213 is fully extended within the channel during the training engagement, end 351 of the channel is not close enough to plunger sensor 370-3 to be detected. As such, the training engagement may be used to determine which plunger sensors should be used for future assessment of whether deadbolt 213 is properly engaged within the channel. Plunger sensors 370-1 and 370-2 may be curved to allow sliding within the channel for when deadbolt 213 is being engaged and disengaged.

Figure 4:
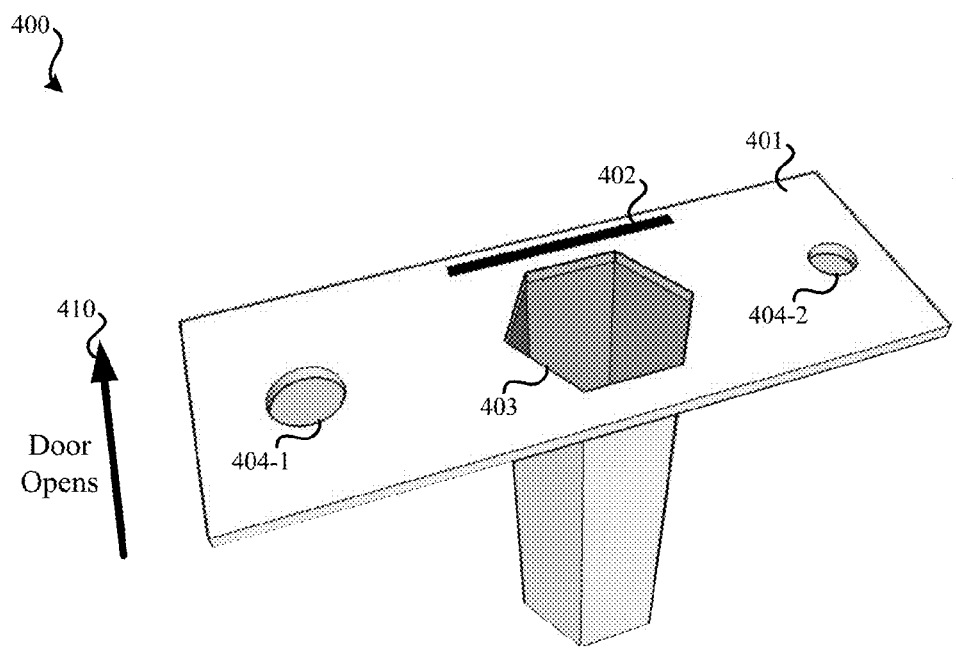
FIG. 4 illustrates an embodiment of an external view of a door trim plate of a door locking and state detection system.

FIG. 4 illustrates an embodiment 400 of an external view of a door trim plate of a door locking and state detection system. Embodiment 400 may represent an embodiment of embodiment 200 of FIG. 2 that uses a reed switch. Mounting holes 404 allow for trim plate 401 to be fastened to a door. Channel 403 may allow a deadbolt to be retracted within the door for when the door is unlocked. Reed switch 402 may be aligned with channel 403 such that when reed switch 402 detects the presence of a magnetic field generated by a strikeplate on the door frame, channel 403 will likely be aligned with the strikeplate on the door frame and the door frame's channel behind the strikeplate. Reed switch 402 may be positioned on trim plate 401 such that when the door is shut, reed switch 402 is of the last portion of trim plate 401 to be aligned with the strikeplate of the door frame; therefore, the reed switch 402 will be unlikely to indicate the door is shut when it is ajar. (Accordingly, reed switch 402 may be positioned on trim plate 401 such that reed switch 402 is toward the side of the door that swings outward as noted by arrow 410.)

Figure 5:
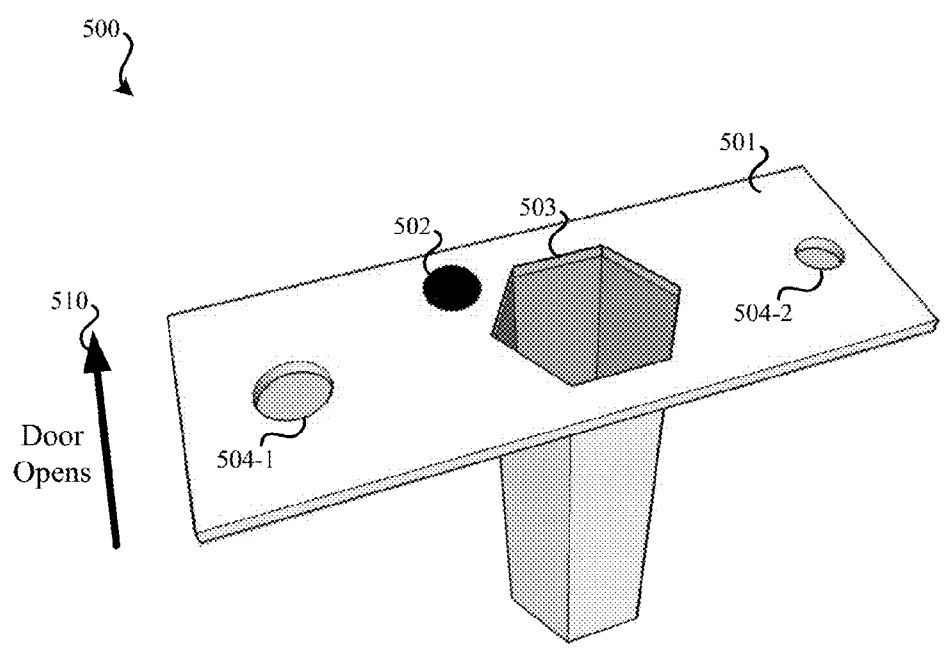
FIG. 5 illustrates another embodiment of an external view of a door trim plate of a door locking and state detection system.

FIG. 5 illustrates an embodiment 500 of an external view of a door trim plate of a door locking and state detection system. Embodiment 500 may represent a drawing of an embodiment of embodiment 200 of FIG. 2 that uses a proximity sensor. Mounting holes 504 allow for trim plate 501 to be fastened to a door. Channel 503 may allow a deadbolt to be retracted within the door for when the door is unlocked. Proximity sensor 502 may be aligned with channel 503 such that, when proximity sensor 502 detects the presence of a strikeplate on the door frame, channel 503 will likely be aligned with the strikeplate on the door frame and the door frame's channel behind the strikeplate. Proximity sensor 502 may be positioned on trim plate 501 such that proximity sensor 502 is of the last portion of trim plate 501 to be aligned with the strikeplate of the door frame when the door is shut; therefore, the proximity sensor 502 will be less likely to indicate the door is shut when it is actually ajar. (Accordingly, proximity sensor 502 may be positioned on trim plate 401 such that proximity sensor 502 is toward the side of the door that swings outward as noted by arrow 510.)

Figure 6:
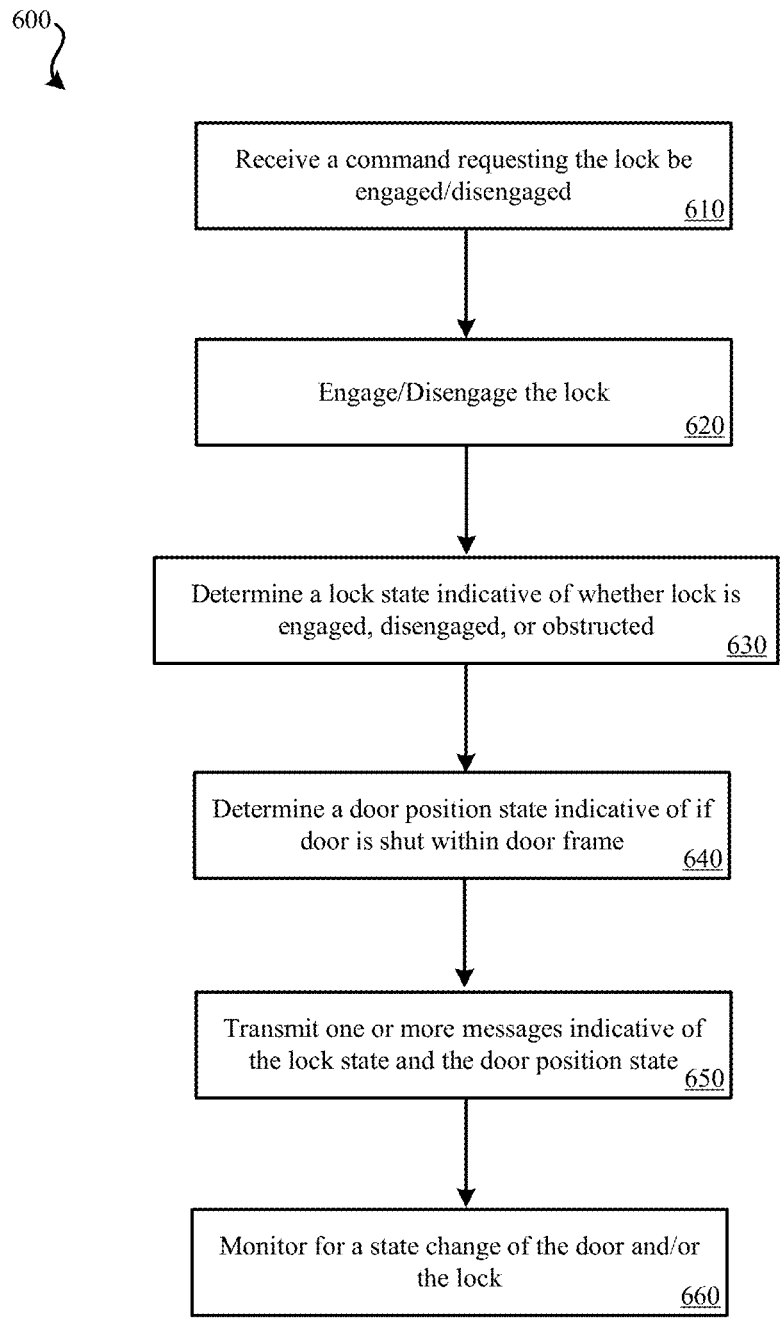
FIG. 6 illustrates an embodiment of a method for using a door locking and state detection system.

Various methods may be performed using the systems and devices detailed in relation to FIGS. 1-5. FIG. 6 illustrates an embodiment of a method 600 for using a door locking and state detection system. Method 600 may use one or more of the devices or system detailed in relation to FIGS. 1-5. Each step of method 600 may be performed using a door lock and sensor unit.

At block 610, a command may be received by a wireless interface of a door lock and sensor unit. The command may be included in one or more wirelessly transmitted packets. The command may indicate that the lock of the door should be engaged or disengaged. The command may include various security messages to decrease the chance of the door lock and sensor unit being operated by an unauthorized user. For instance, the controller of the door lock and sensor unit may be configured to check a PIN code or other identifier that is used to confirm that the command is authorized. Encryption techniques may also be used for wireless data transmission. In some embodiments, the message may request a status update rather than the lock of the door lock and sensor unit being locked or unlocked. In such embodiments, method 600 may skip block 620.

At block 620, the lock may be engaged or disengaged in accordance with the command. If the lock is to be engaged, the engagement may fail if the door is ajar such that a deadbolt cannot be fully extended, such as due to interference from a door frame. In such embodiments, the deadbolt may be retracted. In some embodiments, the deadbolt will not be extended unless the door is determined by the door lock and sensor unit to be shut.

At block 630, a determination of the lock state may be performed by the controller of the door lock and sensor unit by checking the lock of the door lock and sensor unit. The lock states may include engaged, disengaged, or obstructed (e.g., partially engaged). At block 640, a door position state may be determined using either a deadbolt insertion sensor or strikeplate sensor (or both). If both are used, the sensors may be required to agree in order for the controller of the door lock and sensor unit to determine the state of the door is closed or open. If disagreement between such sensors is present, the controller may determine that the door is in an ajar state.

At block 650, one or more messages in the form of one or more packets may be transmitted to the computerized device from which the command was received. The one or more messages may include a state of the door (e.g., open, shut, ajar) and a state of the lock (e.g., engaged, unengaged, partially engaged). At block 660, the controller may monitor for a change in either the state of the door or lock. When a state change is detected, a message may be transmitted to a host of a home automation system, such as the television receiver of FIG. 1. If the lock remains in the engaged position but the door's state changes to open or ajar, this may be an indication of a break-in and a user may be sent one or more (urgent) notifications.

Figure 7:
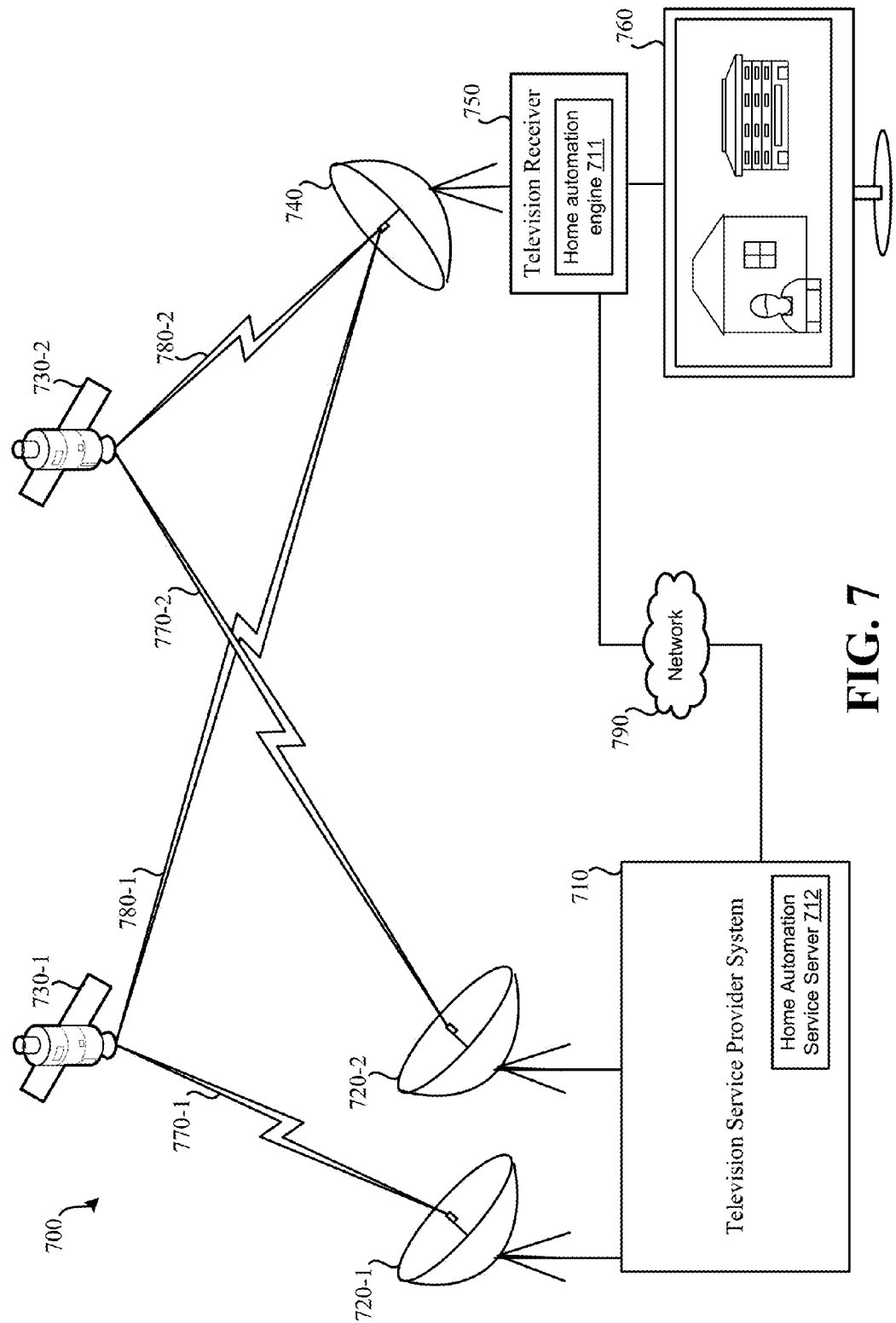
FIG. 7 illustrates an embodiment of a television service provider system that provides home automation functionality.

FIG. 7 illustrates an embodiment of a satellite television distribution system 700. Home automation features, including use of a door lock and sensor unit, can be integrated with satellite television distribution system 700. Cable, IP-based, wireless and broadcast focused systems are also possible. Satellite television distribution system 700 may include: television service provider system 710, satellite transmitter equipment 720, satellites 730, satellite dish 740, television receiver 750, home automation service server 712, and display device 760. Alternate embodiments of satellite television distribution system 700 may include fewer or greater numbers of components. While only one satellite dish 740, television receiver 750, and display device 760 are illustrated, it should be understood that multiple (e.g., tens, thousands, millions of) instances and types of user equipment may receive data and television signals from television service provider system 710 via satellites 730.

Television service provider system 710 and satellite transmitter equipment 720 may be operated by a television service provider. A television service provider may distribute television channels, on-demand programming, programming information, and/or other content/services to users. Television service provider system 710 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 720 may be used to transmit a feed of one or more television channels from television service provider system 710 to one or more satellites 730. While a single television service provider system 710 and satellite transmitter equipment 720 are illustrated as part of satellite television distribution system 700, it should be understood that multiple instances of transmitter equipment may be used, possibly scattered geographically, to communicate with satellites 730. Such multiple instances of satellite transmitting equipment may communicate with the same or with different satellites. Different television channels may be transmitted to satellites 730 from different instances of transmitting equipment. For instance, a different satellite dish of satellite transmitter equipment 720 may be used for communication with satellites in different orbital slots.

Satellites 730 may be configured to receive signals, such as streams of television channels, from one or more satellite uplinks such as satellite transmitter equipment 720. Satellites 730 may relay received signals from satellite transmitter equipment 720 (and/or other satellite transmitter equipment) to multiple instances of user equipment via transponder streams. Different frequencies may be used for uplink signals 770 from downlink signals 780. Satellites 730 may be in geosynchronous orbit. Each of the transponder streams transmitted by satellites 730 may contain multiple television channels transmitted as packetized data. For example, a single transponder stream may be a serial digital packet stream containing multiple television channels. Therefore, packets for multiple television channels may be interspersed. Further, information used by television receiver 750 for home automation functions may be also be relayed to television receiver via one or more transponder streams.

Multiple satellites 730 may be used to relay television channels from television service provider system 710 to satellite dish 740. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 730-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 740 may be a piece of user equipment that is used to receive transponder streams from one or more satellites, such as satellites 730. Satellite dish 740 may be provided to a subscriber for use on a subscription basis to receive television channels provided by the television service provider system 710, satellite transmitter equipment 720, and/or satellites 730. Satellite dish 740, which may include one or more low noise blocks (LNBs), may be configured to receive transponder streams from multiple satellites and/or multiple transponders of the same satellite. Satellite dish 740 may be configured to receive television channels via transponder streams on multiple frequencies. Based on the characteristics of television receiver 750 and/or satellite dish 740, it may only be possible to capture transponder streams from a limited number of transponders concurrently. For example, a tuner of television receiver 750 may only be able to tune to a single transponder stream from a transponder of a single satellite at a given time. The tuner can then be re-tuned to another transponder of the same or a different satellite. A television receiver 750 having multiple tuners may allow for multiple transponder streams to be received at the same time.

Figure 8:
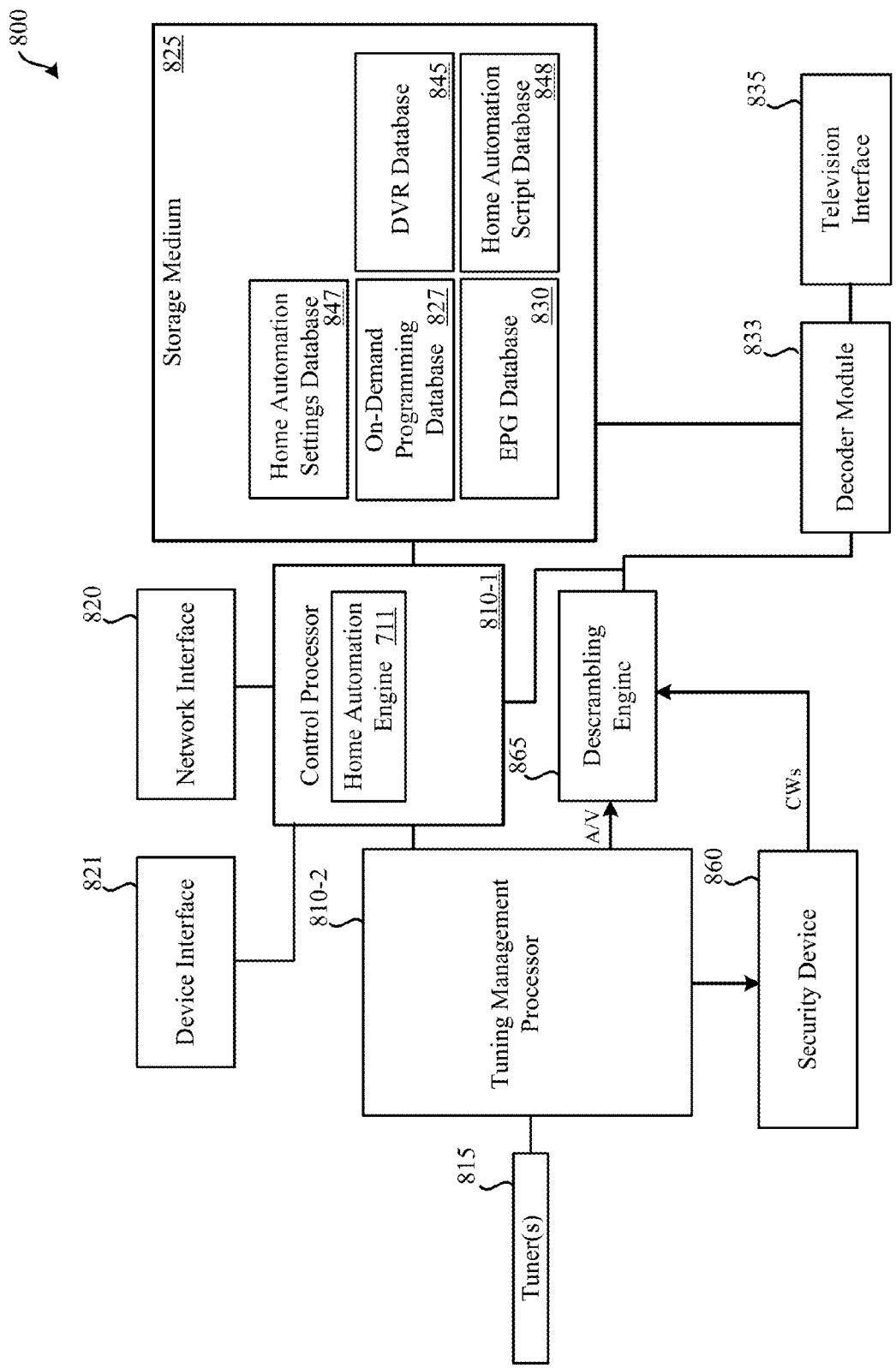
FIG. 8 illustrates an embodiment of a television receiver that functions as a host for a home automation system.

In communication with satellite dish 740 may be one or more television receivers. Television receivers may be configured to decode signals received from satellites 730 via satellite dish 740 for output and presentation via a display device, such as display device 760. A television receiver may be incorporated as part of a television or may be part of a separate device, commonly referred to as a set-top box (STB). Television receiver 750 may decode signals received via satellite dish 740 and provide an output to display device 760. On-demand content, such as PPV content, may be stored to a computer-readable storage medium. FIG. 8 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 7 illustrates an embodiment of television receiver 750 as separate from display device 760, it should be understood that, in other embodiments, similar functions may be performed by a television receiver integrated with display device 760. Television receiver 750 may include home automation engine 711, as detailed in relation to FIG. 8.

Display device 760 may be used to present video and/or audio decoded and output by television receiver 750. Television receiver 750 may also output a display of one or more interfaces to display device 760, such as an electronic programming guide (EPG). In many embodiments, display device 760 is a television. Display device 760 may also be a monitor, computer, or some other device configured to display video and, possibly, play audio.

Uplink signal 770-1 represents a signal between satellite transmitter equipment 720 and satellite 730-1. Uplink signal 770-2 represents a signal between satellite transmitter equipment 720 and satellite 730-2. Each of uplink signals 770 may contain streams of one or more different television channels. For example, uplink signal 770-1 may contain a first group of television channels, while uplink signal 770-2 contains a second group of television channels. Each of these television channels may be scrambled such that unauthorized persons are prevented from accessing the television channels.

Downlink signal 780-1 represents a signal between satellite 730-1 and satellite dish 740. Downlink signal 780-2 represents a signal between satellite 730-2 and satellite dish 740. Each of downlink signals 780 may contain one or more different television channels, which may be at least partially scrambled. A downlink signal may be in the form of a transponder stream. A single transponder stream may be tuned to at a given time by a tuner of a television receiver. For example, downlink signal 780-1 may be a first transponder stream containing a first group of television channels, while downlink signal 780-2 may be a second transponder stream containing a different group of television channels. In addition to or instead of containing television channels, a transponder stream can be used to transmit on-demand content to television receivers, including PPV content (which may be stored locally by the television receiver until output for presentation).

FIG. 7 illustrates downlink signal 780-1 and downlink signal 780-2, being received by satellite dish 740 and distributed to television receiver 750. For a first group of television channels, satellite dish 740 may receive downlink signal 780-1 and for a second group of channels, downlink signal 780-2 may be received. Television receiver 750 may decode the received transponder streams. As such, depending on which television channels are desired to be presented or stored, various transponder streams from various satellites may be received, descrambled, and decoded by television receiver 750.

Network 790, which may include the Internet, may allow for bidirectional communication between television receiver 750 and television service provider system 710, such as for home automation related services provided by home automation service server 712. Network 790 may be connected with or represent the same network as network 170 of FIG. 1. For instance, based on certain conditions, home automation service server 712 may request and receive a status update from door lock and sensor unit regarding the state of a door and lock. In some embodiments, the home automation service server 712 may be able to send a request to a host system, such as home automation engine 711 of television receiver 750, to engage or disengage the lock. In addition or in alternate to network 790, a telephone (e.g., landline) or cellular connection may be used to enable communication between television receiver 750 and television service provider system 710.

FIG. 8 illustrates an embodiment of a television receiver 800, which may represent television receiver 150 of FIG. 1 and/or television receiver 750 or FIG. 7. Television receiver 800 may be configured to function as a host for a home automation system either alone or in conjunction with a communication device. Television receiver 800 may be in the form of a separate device configured to be connected with a display device, such as a television. Embodiments of television receiver 800 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 800 may be incorporated as part of a television, such as display device 160 of FIG. 1. Television receiver 800 may include: processors 810 (which may include control processor 810-1, tuning management processor 810-2, and possibly additional processors), tuners 815, network interface 820, non-transitory computer-readable storage medium 825, electronic programming guide (EPG) database 830, television interface 835, digital video recorder (DVR) database 845 (which may include provider-managed television programming storage and/or user-defined television programming), on-demand programming database 827, home automation settings database 847, home automation script database 848, remote control interface 850, security device 860, and/or descrambling engine 865. In other embodiments of television receiver 800, fewer or greater numbers of components may be present. It should be understood that the various components of television receiver 800 may be implemented using hardware, firmware, software, and/or some combination thereof. Functionality of components may be combined; for example, functions of descrambling engine 865 may be performed by tuning management processor 810-2. Further, functionality of components may be spread among additional components.

Processors 810 may include one or more specialized and/or general-purpose processors configured to perform processes such as tuning to a particular channel, accessing and displaying EPG information from EPG database 830, and/or receiving and processing input from a user. It should be understood that the functions performed by various modules of FIG. 8 may be performed using one or more processors. As such, for example, functions of descrambling engine 865 may be performed by control processor 810-1.

Control processor 810-1 may communicate with tuning management processor 810-2. Control processor 810-1 may control the recording of television channels based on timers stored in DVR database 845. Control processor 810-1 may also provide commands to tuning management processor 810-2 when recording of a television channel is to cease. In addition to providing commands relating to the recording of television channels, control processor 810-1 may provide commands to tuning management processor 810-2 that indicate television channels to be output to decoder module 833 for output to a display device. Control processor 810-1 may also communicate with network interface 820 and remote control interface 850. Control processor 810-1 may handle incoming data from network interface 820 and remote control interface 850. Additionally, control processor 810-1 may be configured to output data via network interface 820.

Control processor 810-1 may include home automation engine 711. Home automation engine 711 may permit television receiver and control processor 810-1 to provide home automation functionality, such as control of a door lock and sensor unit as detailed in this document. Home automation engine 711 may have a JSON (JavaScript Object Notation) command interpreter or some other form of command interpreter that is configured to communicate with wireless devices via network interface 820 and a message server (possibly via a message server client). Such a command interpreter of home automation engine 711 may also communicate via a local area network with devices (without using the Internet). Home automation engine 711 may contain multiple controllers specific to different protocols; for instance, a ZigBee® controller, a Z-Wave® controller, and/or an IP camera controller (wireless LAN, 802.11) may be present. Home automation engine 711 may contain a media server configured to serve streaming audio and/or video to a remote devices (on a local area network or the Internet). Television receiver may be able to serve such devices with recorded content, live content, and/or content recorded using one or more home automation devices, such as camera 112.

Tuners 815 may include one or more tuners used to tune to transponders that include broadcasts of one or more television channels. Such tuners may be used also to receive for storage on-demand content and/or credit-earning television commercials. In some embodiments, two, three, or more than three tuners may be present, such as four, six, or eight tuners. Each tuner contained in tuners 815 may be capable of receiving and processing a single transponder stream from a satellite transponder (or from a cable network) at a given time. As such, a single tuner may tune to a single transponder stream at a given time. If tuners 815 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 815 may be used to receive the signal containing the multiple television channels for presentation and/or recording. Tuners 815 may receive commands from tuning management processor 810-2. Such commands may instruct tuners 815 to which frequencies are to be tuned.

Network interface 820 may be used to communicate via an alternate communication channel with a television service provider, if such communication channel is available. A communication channel may be via satellite (which may be unidirectional to television receiver 800) and the alternate communication channel (which may be bidirectional) may be via a network, such as the Internet. Data may be transmitted from television receiver 800 to a television service provider system and from the television service provider system to television receiver 800. Information may be transmitted and/or received via network interface 820. For instance, instructions from a television service provider may also be received via network interface 820, if connected with the Internet. Besides the primary communication channel being satellite, cable network, an IP-based network, or broadcast network may be used. Network interface 820 may permit wireless communication with one or more types of networks, including using home automation network protocols and wireless network protocols. Also, wired networks may be connected to and communicated with via network interface 820. Device interface 821 may represent a USB port or some other form of communication port that permits communication with a communication device.

Storage medium 825 may represent one or more non-transitory computer-readable storage mediums. Storage medium 825 may include memory and/or a hard drive. Storage medium 825 may be used to store information received from one or more satellites and/or information received via network interface 820. Storage medium 825 may store information related to on-demand programming database 827, EPG database 830, DVR database 845, home automation settings database 847, and/or home automation script database 848. Recorded television programs may be stored using storage medium 825 as part of DVR database 845. Storage medium 825 may be partitioned or otherwise divided (such as into folders) such that predefined amounts of storage medium 825 are devoted to storage of television programs recorded due to user-defined timers and stored television programs recorded due to provider-defined timers.

Home automation settings database 847 may allow configuration settings of home automation devices and user preferences to be stored. Home automation settings database 847 may store data related to various devices that have been set up to communicate with television receiver 800. For instance, home automation settings database 847 may be configured to store information on which types of events should be indicated to users, to which users, in what order, and what communication methods should be used. For instance, an event such as an open garage may only be notified to certain wireless devices (e.g., a cellular phone associated with a parent, not a child), notification may be by a third-party notification server, email, text message, and/or phone call. In some embodiments, a second notification method may only be used if a first fails. For instance, if a notification cannot be sent to the user via a third-party notification server, an email may be sent.

Home automation settings database 847 may store information that allows for the configuration and control of individual home automation devices which may operate using Z-Wave® and Zigbee®-specific protocols. To do so, home automation engine 711 may create a proxy for each device that allows for settings for the device to be passed through a user interface (e.g, presented on a television) to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a user interface of the television receiver or overlay device and passed to the appropriate home automation device and/or used for managing the appropriate home automation device.

Home automation script database 848 may store scripts that detail how home automation devices are to function based on various events occurring. For instance, if stored content starts being played back by television receiver 800, lights in the vicinity of display device 160 may be dimmed and shades may be lowered by shade controller 104. As another example, when a user shuts programming off late in the evening, there may be an assumption the user is going to bed. Therefore, the user may configure television receiver 800 to lock all doors via one or more door lock and sensor units, shut the garage door via garage door controller 128, lower a heat setting of thermostat 122, shut off all lights via light controller 120, and determine if any windows are open via window sensor 109 and door lock and sensor units (and, if so, alert the user). Such scripts or programs may be predefined by the home automation/television service provider and/or may be defined by a user.

EPG database 830 may store information related to television channels and the timing of programs appearing on such television channels. EPG database 830 may be stored using storage medium 825, which may be a hard drive or solid-state drive. Information from EPG database 830 may be used to inform users of what television channels or programs are popular and/or provide recommendations to the user. Information from EPG database 830 may provide the user with a visual interface displayed by a television that allows a user to browse and select television channels and/or television programs for viewing and/or recording. Information used to populate EPG database 830 may be received via network interface 820, via satellite, or some other communication link with a television service provider (e.g., a cable network). Updates to EPG database 830 may be received periodically. EPG database 830 may serve as an interface for a user to control DVR functions of television receiver 800, and/or to enable viewing and/or recording of multiple television channels simultaneously. EPG database 840 may also contain information about on-demand content or any other form of accessible content.

Decoder module 833 may serve to convert encoded video and audio into a format suitable for output to a display device. For instance, decoder module 833 may receive MPEG video and audio from storage medium 825 or descrambling engine 865 to be output to a television. MPEG video and audio from storage medium 825 may have been recorded to DVR database 845 as part of a previously-recorded television program. Decoder module 833 may convert the MPEG video and audio into a format appropriate to be displayed by a television or other form of display device and audio into a format appropriate to be output from speakers, respectively. Decoder module 833 may have the ability to convert a finite number of television channel streams received from storage medium 825 or descrambling engine 865, simultaneously. For instance, decoders within decoder module 833 may be able to only decode a single television channel at a time. Decoder module 833 may have various numbers of decoders.

Television interface 835 may serve to output a signal to a television (or another form of display device) in a proper format for display of video and playback of audio. As such, television interface 835 may output one or more television channels, stored television programming from storage medium 825 (e.g., television programs from DVR database 845, television programs from on-demand programming 830 and/or information from EPG database 830) to a television for presentation. Television interface 835 may also serve to output a CVM.

Digital Video Recorder (DVR) functionality may permit a television channel to be recorded for a period of time. DVR functionality of television receiver 800 may be managed by control processor 810-1. Control processor 810-1 may coordinate the television channel, start time, and stop time of when recording of a television channel is to occur. DVR database 845 may store information related to the recording of television channels. DVR database 845 may store timers that are used by control processor 810-1 to determine when a television channel should be tuned to and its programs recorded to DVR database 845 of storage medium 825. In some embodiments, a limited amount of storage medium 825 may be devoted to DVR database 845. Timers may be set by the television service provider and/or one or more users of television receiver 800.

DVR database 845 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 800 via the television provider's network. For example, in a satellite-based television service provider system, data necessary to create the provider-defined timers at television receiver 150 may be received via satellite.

As an example of DVR functionality of television receiver 800 being used to record based on provider-defined timers, a television service provider may configure television receiver 800 to record television programming on multiple, predefined television channels for a predefined period of time, on predefined dates. For instance, a television service provider may configure television receiver 800 such that television programming may be recorded from 8 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 825 for provider-managed television programming storage.

On-demand programming database 827 may store additional television programming. On-demand programming database 827 may include television programming that was not recorded to storage medium 825 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 827 may be the same for each television receiver of a television service provider. On-demand programming database 827 may include pay-per-view (PPV) programming that a user must pay and/or use an amount of credits to view. For instance, on-demand programming database 827 may include movies that are not available for purchase or rental yet. Typically, on-demand programming is presented commercial-free.

Referring back to tuners 815, television channels received via satellite (or cable) may contain at least some scrambled data. Packets of audio and video may be scrambled to prevent unauthorized users (e.g., nonsubscribers) from receiving television programming without paying the television service provider. When a tuner of tuners 815 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 800 may use decryption engine 861 of security device 860 to decrypt ECMs. Decryption of an ECM may only be possible if the user has authorization to access the particular television channel associated with the ECM. When an ECM is determined to correspond to a television channel being stored and/or displayed, the ECM may be provided to security device 860 for decryption.

When security device 860 receives an encrypted ECM, security device 860 may decrypt the ECM to obtain some number of control words. In some embodiments, from each ECM received by security device 860, two control words are obtained. In some embodiments, when security device 860 receives an ECM, it compares the ECM to the previously received ECM. If the two ECMs match, the second ECM is not decrypted because the same control words would be obtained. In other embodiments, each ECM received by security device 860 is decrypted; however, if a second ECM matches a first ECM, the outputted control words will match; thus, effectively, the second ECM does not affect the control words output by security device 860. Security device 860 may be permanently part of television receiver 800 or may be configured to be inserted and removed from television receiver 800, such as a smart card, cable card or the like.

Tuning management processor 810-2 may be in communication with tuners 815 and control processor 810-1. Tuning management processor 810-2 may be configured to receive commands from control processor 810-1. Such commands may indicate when to start/stop receiving and/or recording of a television channel and/or when to start/stop causing a television channel to be output to a television. Tuning management processor 810-2 may control tuners 815. Tuning management processor 810-2 may provide commands to tuners 815 that instruct the tuners which satellite, transponder, and/or frequency to tune to. From tuners 815, tuning management processor 810-2 may receive transponder streams of packetized data.

Descrambling engine 865 may use the control words output by security device 860 in order to descramble video and/or audio corresponding to television channels for storage and/or presentation. Video and/or audio data contained in the transponder data stream received by tuners 815 may be scrambled. Video and/or audio data may be descrambled by descrambling engine 865 using a particular control word. Which control word output by security device 860 to be used for successful descrambling may be indicated by a scramble control identifier present within the data packet containing the scrambled video or audio. Descrambled video and/or audio may be output by descrambling engine 865 to storage medium 825 for storage (in DVR database 845) and/or to decoder module 833 for output to a television or other presentation equipment via television interface 835.

In some embodiments, the television receiver 800 may be configured to periodically reboot in order to install software updates downloaded over the network 170 or satellites 730 of FIG. 7. Such reboots may occur for example during the night when the users are likely asleep and not watching television. If the system utilizes a single processing module to provide television receiving and home automation functionality, then the security functions may be temporarily deactivated. In order to increase the security of the system, the television receiver 800 may be configured to reboot at random times during the night in order to allow for installation of updates. Thus, an intruder is less likely to guess the time when the system is rebooting. In some embodiments, the television receiver 800 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 800 of FIG. 8 has been reduced to a block diagram; commonly known parts, such as a power supply, have been omitted. Further, some routing between the various modules of television receiver 800 has been illustrated. Such illustrations are for exemplary purposes only. The state of two modules not being directly or indirectly connected does not indicate the modules cannot communicate. Rather, connections between modules of the television receiver 800 are intended only to indicate possible common data routing. It should be understood that the modules of television receiver 800 may be combined into a fewer number of modules or divided into a greater number of modules. Further, the components of television receiver 800 may be part of another device, such as built into a television. Television receiver 800 may include one or more instances of various computerized components, such as disclosed in relation to computer system 900 of FIG. 9.

While the television receiver 800 has been illustrated as a satellite-based television receiver, it is to be appreciated that techniques below may be implemented in other types of television receiving devices, such a cable receivers, terrestrial receivers, IPTV receivers or the like. In some embodiments, the television receiver 800 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 800 may be performed by an overlay device. In such an overlay device, television programming functions may still be provided by a television receiver that is not used to provide home automation functions.

Figure 9:
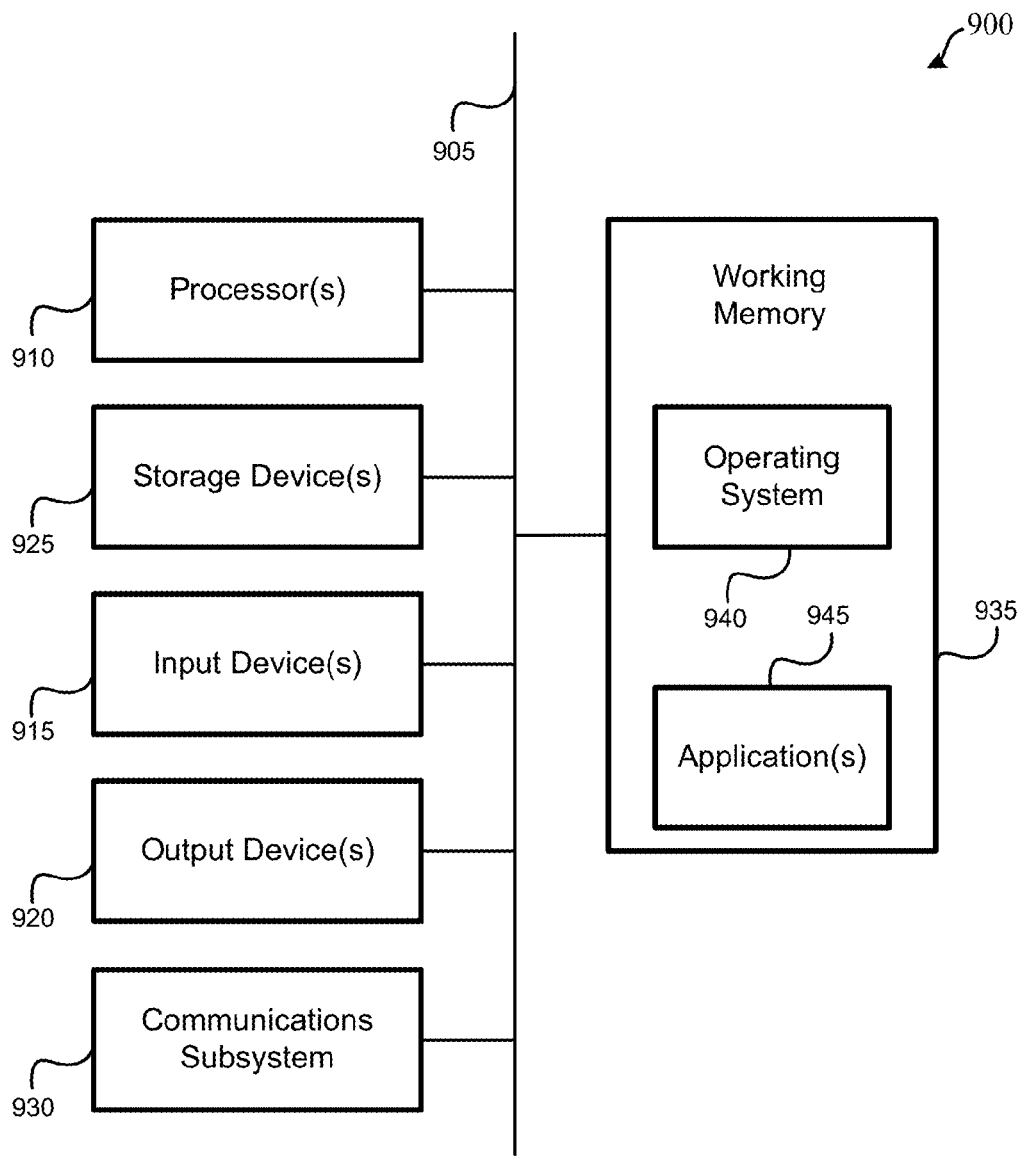
FIG. 9 illustrates an embodiment of a computer system.

A computer system as illustrated in FIG. 9 may be incorporated as part of the previously described computerized devices, such as the television receiver and the controller of the door lock and sensor unit. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An integrated door lock and position sensor system, comprising:
    a housing for installation to a door;
    a wireless interface, housed within the housing, configured to wirelessly communicate with one or more remote computerized devices;
    a lock that, when engaged and the door is closed, prevents the door from being opened from at least one side of the door, wherein
        the lock comprises a deadbolt that extends through a strikeplate into a channel of a doorframe when the lock is engaged;
        the deadbolt comprises a plurality of sensors, wherein the plurality of sensors detect when the deadbolt is inserted in the channel of the doorframe;

a first sensor of the plurality of sensors is located on an end of the deadbolt to detect an end of the channel of the doorframe; and a second sensor of the plurality of sensors is located on a side of the deadbolt to detect a side of the channel of the doorframe;

a controller, housed within the housing, in communication with the plurality of sensors, the lock, and the wireless interface, the controller configured to:

perform a training arrangement in which the lock is engaged within the channel of the doorframe to determine which sensors of the plurality of sensors of the deadbolt properly detect the channel of the doorframe;

receive information from the plurality of sensors that indicates whether the channel of the doorframe is detected; and transmit, via the wireless interface, information indicative of whether the door is open or shut and whether the lock is engaged or disengaged based on the information from the plurality of sensors and the performed training arrangement.

2. The integrated door lock and position sensor system of claim 1, further comprising:

a single power source, comprising a battery, housed within the housing, configured to power the wireless interface, the first sensor, the second sensor, the lock, and the controller.

3. The integrated door lock and position sensor system of claim 1, wherein the first sensor and the second sensor are plunger sensors.

4. The integrated door lock and position sensor system of claim 1, wherein the first sensor and the second sensor are proximity sensors.

5. The integrated door lock and position sensor system of claim 1, further comprising a magnetized channel plate, wherein:

the first sensor is within the deadbolt such that the first sensor, when the lock is engaged within the channel of the doorframe, detects the magnetized channel plate located at the end of the channel when the door is closed.

6. The integrated door lock and position sensor system of claim 5, wherein the first sensor comprises a reed switch that detects the magnetized channel plate located at the end of the channel when the door is closed and the lock is engaged.

7. The integrated door lock and position sensor system of claim 1, the controller being further configured to:

receive a message via the wireless interface; and engage the lock in response to the message.

8. An integrated door lock and position sensor apparatus, comprising:

a housing means configured to be installed on a door;

a wireless interface means, housed within the housing means, configured to wirelessly communicate with one or more remote computerized devices;

a locking means that, when engaged and the door is closed, prevents the door from being opened from at least one side of the door, wherein:

the locking means comprises a deadbolt that extends through a strikeplate into a channel of a doorframe when the locking means is engaged;

the deadbolt comprises a plurality of sensing means, wherein the plurality of sensing means detect when the deadbolt is inserted in the channel of the doorframe;

a first sensing means of the plurality of sensing means is located on a first portion of the deadbolt to detect a first portion of the channel of the doorframe; and a second sensing means of the plurality of sensing means is located on a second portion of the deadbolt to detect a second portion of the channel of the doorframe;

a processing means, located within the housing means, in communication with the plurality of sensing means, the locking means, and the wireless interface means, the processing means configured to:

perform a training arrangement in which the locking means is engaged within the channel of the doorframe to determine which sensing means of the plurality of sensing means of the deadbolt detect the channel of the doorframe;

receive information from the plurality of sensing means that indicates whether the channel of the doorframe is detected; and cause information indicative of whether the locking means is engaged within the channel of the doorframe to be transmitted based on the information from the plurality of sensing means and the training arrangement.

* * * * *